(12) United States Patent
Yamashita et al.

(10) Patent No.: US 11,565,650 B2
(45) Date of Patent: Jan. 31, 2023

(54) AIRBAG DEVICE

(71) Applicant: ASHIMORI INDUSTRY CO., LTD., Settsu (JP)

(72) Inventors: Satoshi Yamashita, Settsu (JP); Daijiro Katayama, Settsu (JP); Kazuyoshi Nakai, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/117,389

(22) Filed: Dec. 10, 2020

(65) Prior Publication Data

US 2021/0179008 A1 Jun. 17, 2021

(30) Foreign Application Priority Data

Dec. 13, 2019 (JP) .............................. JP2019-225607

(51) Int. Cl.
*B60R 21/201* (2011.01)
*B60R 21/2334* (2011.01)
*B60R 21/237* (2006.01)
*B60R 21/2165* (2011.01)
*B60R 21/231* (2011.01)
(Continued)

(52) U.S. Cl.
CPC ........ *B60R 21/2334* (2013.01); *B60R 21/201* (2013.01); *B60R 21/2165* (2013.01); *B60R 21/231* (2013.01); *B60R 21/235* (2013.01); *B60R 21/237* (2013.01); *B60R 21/2342* (2013.01); *B60R 21/2176* (2013.01); (Continued)

(58) Field of Classification Search
CPC . B60R 21/201; B60R 21/2334; B60R 21/237; B60R 21/235; B60R 21/2176; B60R 21/205; B60R 21/2165; B60R 21/231; B60R 21/2342; B60R 2021/23509; B60R 2021/161; B60R 2021/0009; B60R 2021/0048; B60R 2021/0004; B60R 2021/0006; B60R 2021/23538; B60R 2021/23576
USPC ............................................. 280/743.1, 732
See application file for complete search history.

(56) References Cited

U.S. PATENT DOCUMENTS

2010/0320737 A1 12/2010 Matsunaga et al.
2011/0193328 A1* 8/2011 Fukawatase .......... B60R 21/206
280/730.2
(Continued)

FOREIGN PATENT DOCUMENTS

JP WO2009/066404 A1 5/2009

*Primary Examiner* — Keith J Frisby
(74) *Attorney, Agent, or Firm* — Sughrue Mion, PLLC

(57) ABSTRACT

An airbag device configured to be disposed in front of an occupant in a vehicle includes: an inflator configured to generate gas; an airbag that is folded and housed, the airbag being configured to be inflated and deployed by the gas generated by the inflator; and a holding member including an attachment portion to which the inflator is attached, and holding the folded airbag capable of being inflated and deployed from an occupant side opposite the attachment portion. The holding member includes an inhibiting portion that covers a part of the folded airbag from the occupant side and that is configured to partially inhibit initial inflation and deployment of the airbag. The inhibiting portion has a first region and a second region where inhibiting forces that inhibit the initial inflation and deployment are different from each other.

5 Claims, 24 Drawing Sheets

(51) Int. Cl.
*B60R 21/2342* (2011.01)
*B60R 21/235* (2006.01)
*B60R 21/205* (2011.01)
*B60R 21/00* (2006.01)
*B60R 21/217* (2011.01)

(52) U.S. Cl.
CPC ................ *B60R 2021/0009* (2013.01); *B60R 2021/23509* (2013.01)

(56) References Cited

U.S. PATENT DOCUMENTS

2016/0159311 A1* 6/2016 Yamada ................ B60R 21/268 280/729
2019/0283702 A1* 9/2019 Yamada ................ B60R 21/233

* cited by examiner

AIRBAG DEVICE

CROSS-REFERENCE TO RELATED APPLICATIONS

This application is based upon and claims the benefit of priority from prior Japanese patent application No. 2019-225607, filed on Dec. 13, 2019, the entire contents of which are incorporated herein by reference.

TECHNICAL FIELD

The present disclosure relates to an airbag device. More specifically, the present disclosure relates to an airbag device that is attached to a vehicle such as an automobile, and that is inflated and deployed in front of a seated occupant toward the occupant at the time of a vehicle collision.

BACKGROUND

An airbag device that protects an occupant by inflating and deploying an airbag at the time of collision of a vehicle is known. For example, an airbag device for a passenger seat is inflated and deployed in front of a seated occupant at the time of collision of the vehicle, and receives and protects the occupant moving forward. Generally, the airbag is folded and housed in an instrument panel in front of the passenger seat.

As a technology related to the airbag device for a passenger seat, an airbag disclosed in WO 2009/066404 is compressed to form a plurality of layers in an upper-lower direction and includes the upper layer portion to be deployed first and the lower layer portion located below the upper layer portion. The upper layer portion of the airbag is inflated and deployed from a windshield side by covering the lower layer portion of the airbag with an inner flap.

Although the airbag device with the inner flap described in WO 2009/066404 can control a timing of inflation and deployment of the airbag in a vehicle front-rear direction, the airbag device cannot control a timing of inflation and deployment of the airbag in a vehicle left-right direction (vehicle width direction). That is, the timing of inflation and deployment of the airbag can be controlled in only one direction.

SUMMARY

The present disclosure has been made in view of the above circumstances, and an object thereof is to provide an airbag device capable of controlling timing of inflation and deployment in two directions.

In one aspect of the present disclosure, an airbag device configured to be disposed in front of an occupant in a vehicle includes: an inflator configured to generate gas; an airbag that is folded and housed, the airbag being configured to be inflated and deployed by the gas generated by the inflator; and a holding member including an attachment portion to which the inflator is attached, and holding the folded airbag capable of being inflated and deployed from an occupant side opposite the attachment portion, in which the holding member includes an inhibiting portion that covers a part of the folded airbag from the occupant side, the inhibiting portion being configured to partially inhibit initial inflation and deployment of the airbag, and the inhibiting portion has a first region and a second region where inhibiting forces that inhibit the initial inflation and deployment are different from each other.

In another aspect of the present disclosure, an airbag device configured to be disposed in front of an occupant in a vehicle includes: an inflator configured to generate gas; an airbag that is folded and housed, the airbag being configured to be inflated and deployed by the gas generated by the inflator; and a fabric housing including an attachment portion to which the inflator is attached, and housing the folded airbag capable of being inflated and deployed from an occupant side opposite the attachment portion, in which the fabric housing includes: an inhibiting portion that covers a part of the folded airbag from the occupant side and that is configured to partially inhibit initial inflation and deployment of the airbag; a first side wall portion adjacent to one end portion of the inhibiting portion in a vehicle width direction; and a second side wall portion adjacent to the other end portion of the inhibiting portion in the vehicle width direction, a first sewn portion, in which a common base fabric constituting the inhibiting portion and the first side wall portion is sewn, is provided at a boundary between the inhibiting portion and the first side wall portion, a second sewn portion, in which a common base fabric constituting the inhibiting portion and the second side wall portion is sewn, is provided at a boundary between the inhibiting portion and the second side wall portion, and a length of the first sewn portion is different from a length of the second sewn portion.

In another aspect of the present disclosure, an airbag device configured to be disposed in front of an occupant in a vehicle includes: an inflator configured to generate gas; an airbag that is folded and housed, the airbag being configured to be inflated and deployed by the gas generated by the inflator; and a band shaped member including an attachment portion to which the inflator is attached, and holding the folded airbag capable of being inflated and deployed from an occupant side opposite the attachment portion, in which the band shaped member includes an inhibiting portion that covers a part of the folded airbag from the occupant side, the inhibiting portion being configured to partially inhibit initial inflation and deployment of the airbag, and in the band shaped member, a width of one end portion of the inhibiting portion in a vehicle width direction and a width of the other end portion of the inhibiting portion in the vehicle width direction are different from each other.

According to the present disclosure, it is possible to provide the airbag device capable of controlling the timing of inflation and deployment in two directions.

DETAILED DESCRIPTION

Hereinafter, an airbag device for a passenger seat according to embodiments of the present disclosure will be described with reference to the drawings.

First Embodiment

Figure 1:
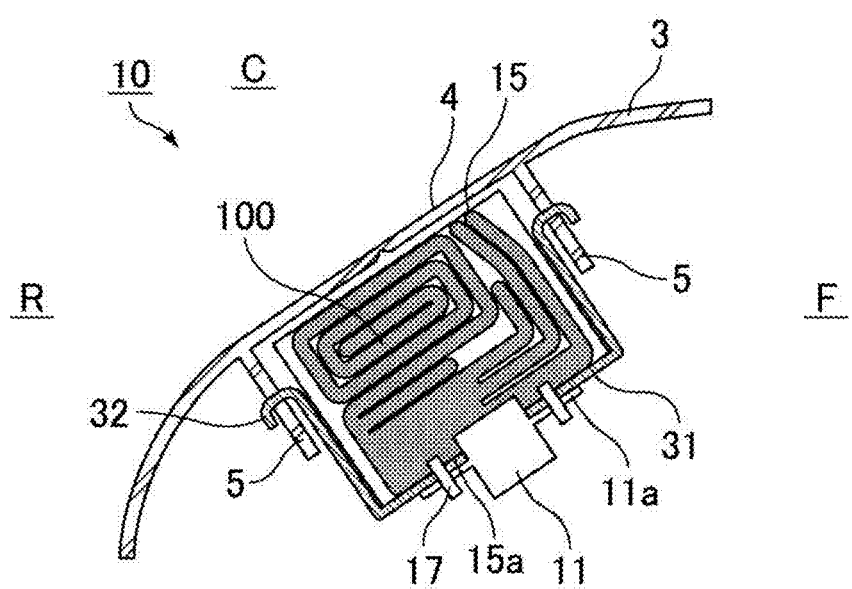
FIG. 1 is a cross-sectional view of an initial state of an airbag device according to a first embodiment when viewed from a vehicle width direction.
Figure 2:
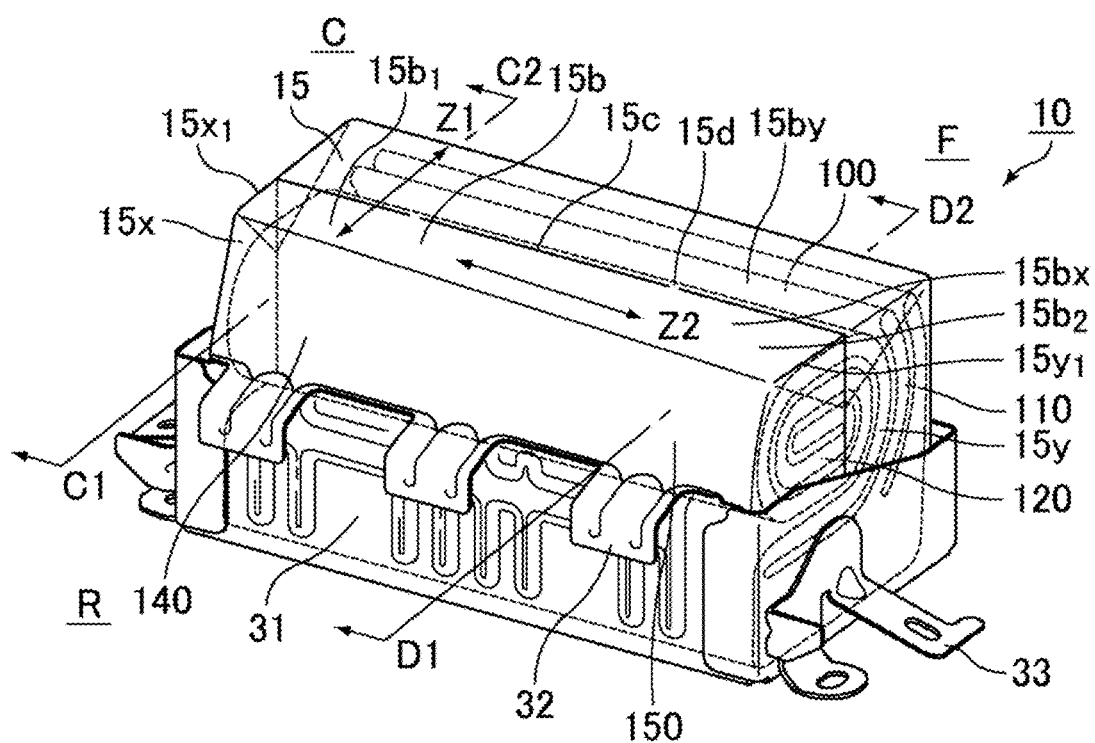
FIG. 2 is a perspective view illustrating the initial state of the airbag device according to the first embodiment.

First, an initial state of an airbag device according to a first embodiment will be described with reference to FIGS. 1 and 2. FIG. 1 is a cross-sectional view of the initial state of the airbag device according to the first embodiment when viewed from a vehicle width direction. FIG. 2 is a perspective view illustrating the initial state of the airbag device according to the first embodiment. In this specification, an airbag 100 is described based on a state of being attached to a vehicle. For example, a direction along a line connecting a vehicle front side F and a vehicle rear side (occupant side) R is referred to as "vehicle front-rear direction", and a direction orthogonal to the line connecting the vehicle front side F and the vehicle rear side R is referred to as "vehicle width direction".

An airbag device 10 according to the first embodiment includes an inflator (gas generating device) 11 disposed inside an upper surface of an instrument panel 3 located in front of a passenger seat and configured to generate gas, a bag-shaped airbag 100 that is folded and housed, and configured to be inflated and deployed by the gas generated by the inflator 11, and a fabric housing 15 as a holding member including an attachment portion 15a to which the inflator 11 is attached and holding the folded airbag 100. The airbag 100 is inflated and deployed from an occupant side C opposite the attachment portion 15a of the fabric housing 15. In the present specification, the "initial state" means a housed state before ignition of the inflator 11, that is, before inflation and deployment of the airbag 100.

In the present embodiment, the airbag 100 is provided with a portion that is inflated without being restricted by the fabric housing 15 and a portion that is inflated under the restriction of the fabric housing 15 from immediately after start of the inflation to the initial inflation and deployment (within 25 milliseconds). In the case of FIG. 2, a first folded portion 110 disposed on the vehicle front side F corresponds to the portion that is inflated without being restricted by the fabric housing 15, and a second folded portion 120 adjacent to the first folded portion 110 and disposed on the vehicle rear side R corresponds to the portion that is inflated under the restriction of the fabric housing 15. The fabric housing 15 includes an inhibiting portion 15b that covers the first folded portion 110 and the second folded portion 120 from the occupant side C opposite the attachment portion 15a of the folded airbag 100, and that partially inhibits the initial inflation and deployment of the airbag 100. The inhibiting portion 15b is a portion having a function of inhibiting the initial inflation and deployment of the airbag 100 to the occupant side C, and is disposed on the vehicle rear side R of slits 15c in the fabric housing 15 in the case of FIG. 2. That is, in the folded airbag 100, the second folded portion 120 covered with the inhibiting portion 15b is disposed on the vehicle rear side R of the slits 15c, and the first folded portion 110 not covered with the inhibiting portion 15b is disposed on the vehicle front side F of the slits 15c.

In the present embodiment, the fabric housing 15 has the slits 15c formed intermittently along the vehicle width direction at a center of an occupant side surface, and is configured such that connecting portions 15d between the slits 15c are ruptured by the pressure of the airbag 100 that is inflated immediately after the start of the inflation. Due to the rupture of the connecting portions 15d, an opening is formed in the occupant side C and the vehicle front side F of the fabric housing 15, and the first folded portion 110 of the airbag 100 is deployed out of the fabric housing 15 through the opening.

On the other hand, since the inhibiting portion 15b located on the occupant side C and the vehicle rear side R of the fabric housing 15 is connected to a first side wall portion 15x of the fabric housing 15 adjacent to one end portion in the vehicle width direction and a second side wall portion 15y of the fabric housing 15 adjacent to the other end portion in the vehicle width direction, the inhibiting portion 15b inhibits the initial inflation and deployment of the second folded portion 120 of the airbag 100 without forming an opening even after the connecting portions 15d are ruptured. By providing such an inhibiting portion 15b, the initial inflation and deployment of a portion covered with the inhibiting portion 15b of the airbag 100 is inhibited as compared with a portion not covered with the inhibiting portion 15b. That is, it is possible to control a timing of inflation and deployment of the airbag 100 in a first direction Z1 in which both the portion covered with the inhibiting portion 15b and the portion not covered with the inhibiting portion 15b are included.

Further, in the fabric housing 15 of the present embodiment, since the length of a coupling portion between the inhibiting portion 15b and the first side wall portion 15x is different from the length of a coupling portion between the inhibiting portion 15b and the second side wall portion 15y, inhibiting forces on a first side wall portion 15x side and a second side wall portion 15y side are different from each other. That is, when the folded airbag 100 is viewed from the occupant side C, the inhibiting portion 15b covering the second folded portion 120 has a first region 15b1 and a second region 15b2 where inhibiting forces that inhibit the initial inflation and deployment are different from each other. Since the inhibiting portion 15b has the first region 15b1 and the second region 15b2 where inhibiting forces that inhibit the initial inflation and deployment are different from each other, the initial inflation and deployment of the airbag 100 covered with one of the first region 15b1 and the second region 15b2 can be further inhibited than the initial inflation and deployment of the airbag 100 covered with the other. That is, it is possible to control a timing of inflation and deployment in a second direction Z2 in which both the portion covered with the first region 15b1 and the portion covered with the second region 15b2 of the inhibiting portion 15b are included. As described above, in the present embodiment, it is possible to control the timing of the inflation and deployment of the airbag 100 in two directions. Hereinafter, configurations will be described in detail.

The inflator 11 operates at the time of collision of the vehicle. First, when a collision detection sensor mounted on the vehicle detects collision of the vehicle, an ECU (Electronic Control Unit) calculates a signal sent from the collision detection sensor, and the level of the collision is determined. When the determined level of the collision corresponds to a case where the airbag 100 is inflated, the inflator 11 is ignited, and gas is generated in a chemical reaction caused by combustion. The generated gas is discharged from a gas injection hole of the inflator 11 to an inside of the airbag 100.

The airbag 100 has a bag-shape, and before the inflator 11 operates, the airbag 100 is folded and housed in the fabric housing 15 disposed inside the upper surface of the instrument panel 3. When the inflator 11 operates, the gas generated from the inflator 11 is filled in the airbag 100, and the airbag 100 is inflated. As a result, the airbag 100 ruptures the connecting portions 15d between the slits 15c of the fabric housing 15, pushes a lid 4 provided on the instrument panel 3, and is inflated and deployed in the vehicle interior while the folding is unfolded.

The airbag 100 may be formed of yarn such as nylon 66 or polyethylene terephthalate (PET). A surface of the airbag 100 may be coated with an inorganic substance such as silicon in order to improve heat resistance, airtightness, and the like.

The fabric housing 15 may be formed of the same material as the airbag 100, and can be made of yarn such as nylon 66 and polyethylene terephthalate (PET). The slits 15c are provided on the occupant side surface (upper surface) of the fabric housing 15. As illustrated in FIG. 2, the plurality of slits 15c formed intermittently are preferably used. When the connecting portions 15d between the slits 15c are ruptured by the inflated airbag 100, the opening allowing inflation and deployment of the airbag 100 is formed.

The attachment portion 15a, which is a mounting hole for mounting the inflator 11, is provided on a lower surface of the fabric housing 15, and a portion of the inflator 11 where the gas ejection hole is provided is inserted into the attachment portion 15a. A metal clamping plate (see a clamping plate 16 illustrated in FIG. 3, for example) having a mounting hole for mounting the inflator 11 is disposed inside the airbag 100. Four bolts 17 protruding downward are vertically provided around the mounting hole for mounting the inflator 11 in the clamping plate. The airbag 100, the fabric housing 15, a metal housing 31, and a flange portion 11a of the inflator 11 are penetrated by the bolts 17 and fixed by fastening with nuts.

The metal housing 31 is attached to a peripheral wall 5 protruding into the instrument panel 3 by a plurality of hooks 32 provided on side walls. Further, the metal housing 31 is attached to a vehicle body by an attachment portion 33 protruding from a side surface.

As for the other components of the airbag device 10 according to the first embodiment, a related-art airbag structure for a passenger seat can be applied.

Figure 3:
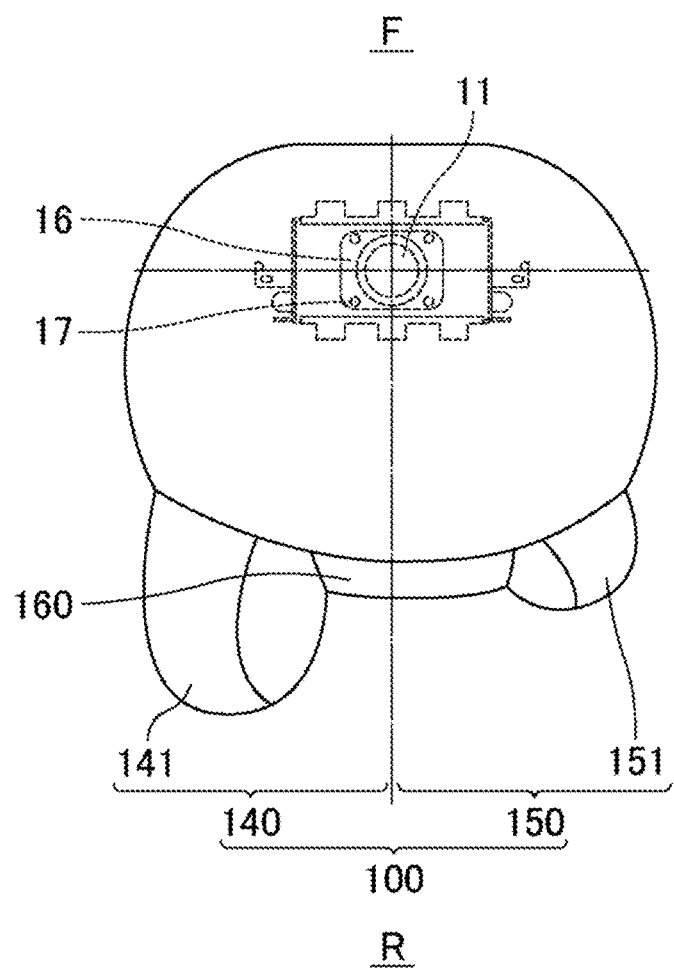
FIG. 3 is a diagram illustrating a state in which an airbag according to the first embodiment is inflated and deployed when viewed from above a vehicle.

Next, the configuration and function of the airbag 100 according to the first embodiment during inflation and deployment will be described. FIG. 3 is a diagram illustrating a state in which the airbag according to the first embodiment is inflated and deployed when viewed from above the vehicle.

The inflator 11 is disposed at the center of the inflated and deployed airbag 100 in the vehicle width direction, and a first inflation portion 140 that is inflated and deployed on one side with respect to the inflator 11 and a second inflation portion 150 that is inflated and deployed on the other side with respect to the inflator 11 are formed on two sides of the airbag 100 in the vehicle width direction. More specifically, in the present embodiment, the one side with respect to the inflator 11 corresponds to a left side of the inflator 11 toward the vehicle front side F, and the other side with respect to the inflator 11 corresponds to a right side of the inflator 11 toward the vehicle front side F. The first inflation portion 140 includes a first protruding portion (one protruding portion) 141 protruding toward the vehicle rear side R by inflation and deployment, and the second inflation portion 150 includes a second protruding portion (the other protruding portion) 151 protruding toward the vehicle rear side R by inflation and deployment. In the present embodiment, the first protruding portion 141 is inflated larger than the second protruding portion 151, and the first inflation portion 140 is inflated and deployed larger than the second inflation portion 150.

Figure 4:
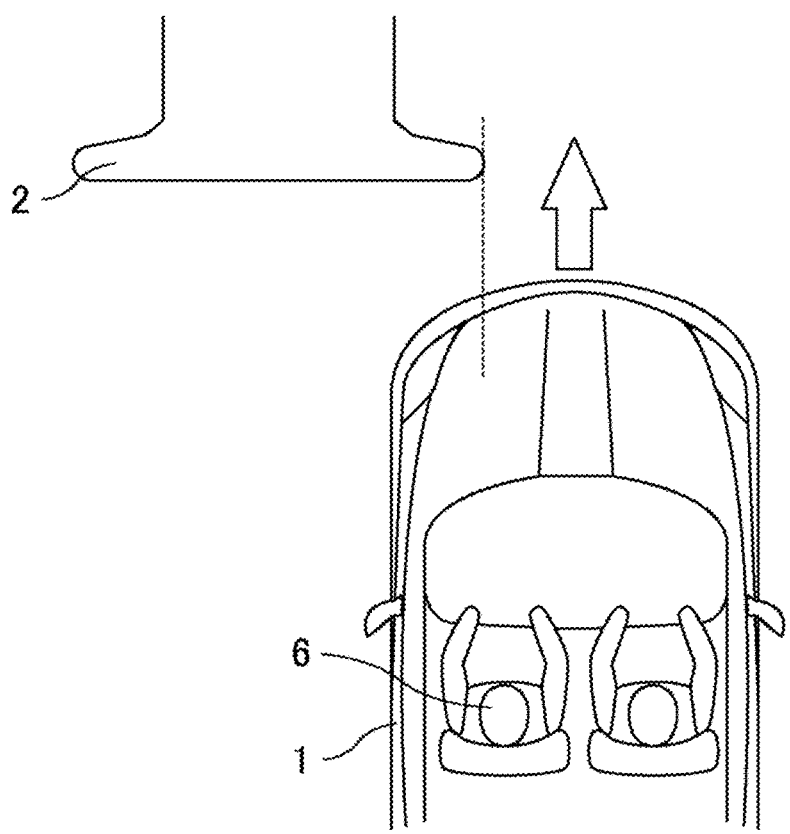
FIG. 4 is a diagram illustrating a scene of an oblique collision of the vehicle.

In recent years, progress has been made in the airbag device that is disposed on the vehicle front side of the occupant, which is suitable for occupant protection during an oblique collision, such as a small overlap impact and an oblique impact of the vehicle. FIG. 4 is a diagram illustrating a scene of the oblique collision of the vehicle. As illustrated in FIG. 4, when the vehicle 1 undergoes the oblique collision in which a front portion of the vehicle 1 collides with a narrow obstacle 2 such as a tree or a utility pole, a force that moves obliquely forward of the vehicle 1 acts on the occupant 6.

Since the first inflation portion 140 inflated and deployed on the left side of the inflator 11 toward the vehicle front side F is inflated and deployed larger than the second inflation portion 150 inflated and deployed on the right side of the inflator 11, in a case where the airbag device 10 is used as the airbag for a passenger seat of a left-hand drive vehicle, even if the vehicle causes the oblique collision on a driver seat side, the airbag 100 according to the present embodiment can receive an occupant seating on the passenger seat who is moved obliquely forward to the left toward the vehicle front side F, prevent the occupant from deviating from the airbag 100, and appropriately protect the occupant. Further, since the first protruding portion 141 and the second protruding portion 151 are provided in the airbag 100, it is possible to further reduce the deviating of the occupant from the airbag 100 and more appropriately protect the occupant.

The inhibiting portion 15b of the present embodiment has the first region 15b1 and the second region 15b2 where the inhibiting forces that inhibit the initial inflation and deployment are different from each other, and the one of the first region 15b1 and the second region 15b2 where the inhibiting force is large is covered with the first inflation portion 140 and the first protruding portion 141, the other of the first region 15b1 and the second region 15b2 where the inhibiting force is small is covered with the second inflation portion 150 and the second protruding portion 151.

A vent hole for discharging the gas in the airbag 100 may be provided in the airbag 100, and the number and the size of the vent holes can be appropriately selected.

Next, a method of folding the airbag 100 according to the present embodiment will be described. In this specification, a side portion of the airbag 100 in the vehicle width direction is referred to as a "side region".

Figure 5:
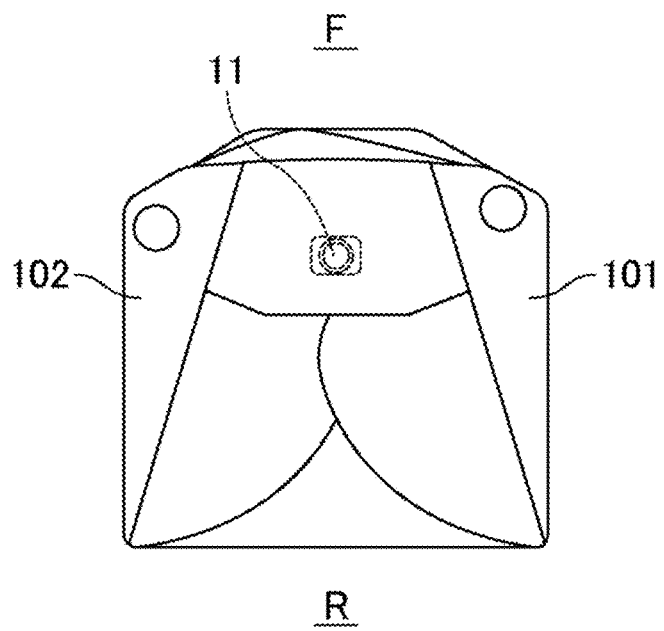
FIG. 5 is a plan view of the airbag according to the first embodiment.
Figure 6:
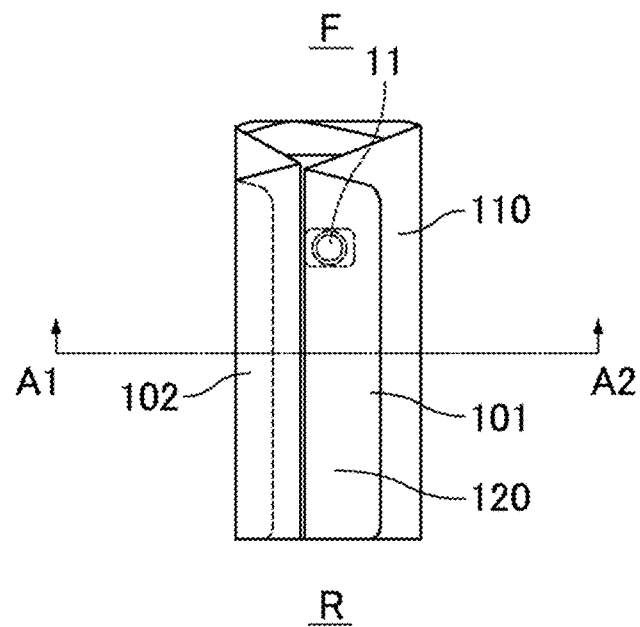
FIG. 6 is a plan view illustrating a folding step (1) of the airbag according to the first embodiment.
Figure 7:
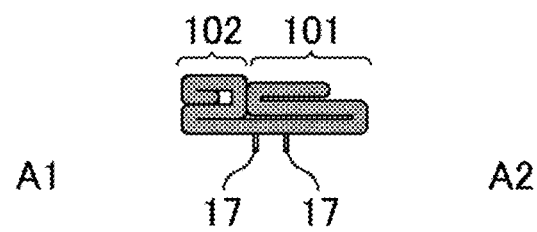
FIG. 7 is a cross-sectional view illustrating the folding step (1) of the airbag according to the first embodiment, taken along a line A1-A2.

FIG. 5 is a plan view of the airbag according to the first embodiment. FIG. 6 is a plan view illustrating a folding step (1) of the airbag according to the first embodiment. FIG. 7 is a cross-sectional view taken along a line A1-A2 illustrating the folding step (1) of the airbag according to the first embodiment.

The vehicle front side F of the airbag 100 including the first protruding portion 141 and the second protruding portion 151 is tuck-folded and folded so as to be in a state illustrated in FIG. 5. After that, by the folding step (1), a first side region 101 which is a side region on a vehicle outer side of the airbag 100, and a second side region 102 which is a side region on a vehicle center side (vehicle equipment side) are bellows-folded so as to shorten a dimension of the airbag 100 in the vehicle width direction, and are brought into states illustrated in FIGS. 6 and 7. By forming the first folded portion 110 and the second folded portion 120 adjacent to each other in the vehicle front-rear direction as described above, the airbag 100 is formed in a shape that is short in the vehicle width direction and elongated in the vehicle front-rear direction.

Figure 8:
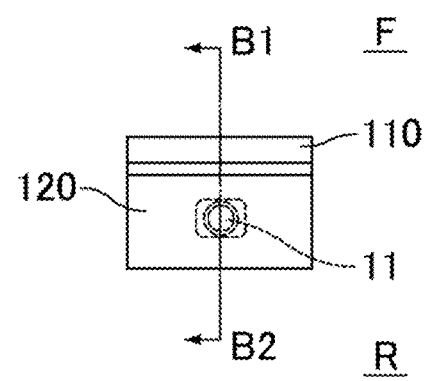
FIG. 8 is a plan view illustrating a folding step (2) of the airbag according to the first embodiment.
Figure 9:
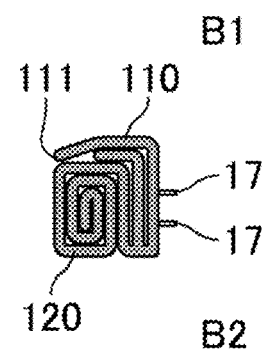
FIG. 9 is a cross-sectional view illustrating the folding step (2) of the airbag according to the first embodiment, taken along a line B1-B2.
Figure 10:
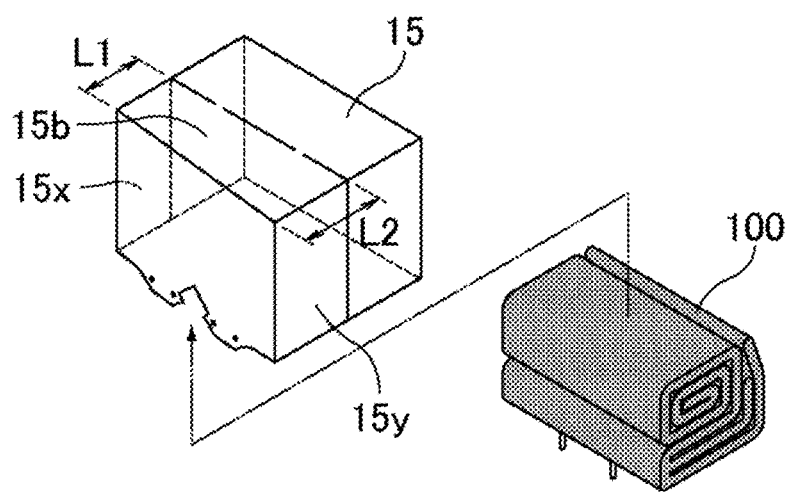
FIG. 10 is a perspective view illustrating a state in which the airbag after being folded is housed in a fabric housing.

FIG. 8 is a plan view illustrating a folding step (2) of the airbag according to the first embodiment. FIG. 9 is a cross-sectional view illustrating the folding step (2) of the airbag according to the first embodiment, taken along a line B1-B2. FIG. 10 is a perspective view illustrating a state in which the folded airbag is housed in the fabric housing.

In the folding step (2), the airbag 100 is folded to shorten the dimension of the airbag 100 in the vehicle front-rear direction. Specifically, the second folded portion 120 is folded back toward an inflator 11 side, and lap wound in a roll shape from a front end thereof, and then the second folding portion 120 folded in a roll shape is formed as illustrated in FIGS. 8 and 9. Subsequently, the first folded portion 110 is bended to cover the periphery of the second folded portion 120 folded in the roll shape, and as illustrated in FIGS. 8 and 9, the first folded portion 110 having a lid-side tip end portion 111 is formed. By the above-described folding procedure, the airbag 100, in which the first folded portion 110 is tuck-folded and the second folded portion 120 is folded in the roll shape, is obtained, and the folding of the airbag 100 is completed. The folded airbag 100 is housed in the fabric housing 15 as illustrated in FIG. 10, and the airbag device 10 in the state illustrated in FIG. 2 described above is completed. Here, the inhibiting portion 15b of the fabric housing 15 illustrated in FIG. 10 is connected to the first side wall portion 15x adjacent to the one end portion in the vehicle width direction and the second side wall portion 15y adjacent to the other end portion, and a length L1 of the coupling portion between the inhibiting portion 15b and the first side wall portion 15x is shorter than a length L2 of the coupling portion between the inhibiting portion 15b and the second side wall portion 15y.

As illustrated in FIG. 2, the folded airbag 100 includes the first folded portion 110 disposed on the vehicle front side F, and the second folded portion 120 adjacent to the first folded portion 110 and disposed on the vehicle rear side R, and the second folded portion 120 is located in the first region 15b1 and the second region 15b2. With this aspect, the first folded portion 110 not covered with the inhibiting portion 15b and disposed on the vehicle front side F is capable of being inflated and deployed earlier than the second folded portion 120 covered with the inhibiting portion 15b and disposed on the vehicle rear side R, and thus, it is possible to control timing of the initial inflation and deployment in the vehicle front-rear direction in the folded airbag 100. Specifically, the first folded portion 110 on the vehicle front side F of the airbag 100 is deployed in a vehicle interior space in advance, and comes into contact with a windshield (not illustrated) in a state where an internal pressure of the first folded portion 110 is high, thereby preventing the upward deployment of the airbag 100. Further, the first region 15b1 is located on one side in the vehicle width direction, and the second region 15b2 is located on the other side in the vehicle width direction. With this aspect, it is possible to control timing of the initial inflation and deployment of the second folded portion 120 of the airbag 100 in the vehicle width direction.

As described above, in the airbag 100 of the present embodiment, the first inflation portion 140 inflated and deployed on the one side with respect to the inflator 11 is inflated and deployed larger than the second inflation portion 150 inflated and deployed on the other side with respect to the inflator 11. In the related-art airbag device, during the initial inflation and deployment, a portion of the airbag device that is inflated and deployed relatively small is filled with gas to be inflated and deployed toward the occupant side earlier than a portion of the airbag device that is inflated and deployed relatively large. Therefore, when there are a plurality of portions having different sizes during inflation and deployment, in other words, when there are a plurality of portions having different volumes, a difference occurs in timing of the inflation and deployment for the plurality of portions, and swinging of the airbag 100 is likely to occur during the airbag deployment.

Therefore, in the present embodiment, the inhibiting portion 15b is provided in the fabric housing 15, and has the first region 15b1 and the second region 15b2 where the inhibiting forces during the initial inflation and deployment of the airbag 100 are different, so that the swinging of the airbag 100 during inflation and deployment is prevented. The effect of the fabric housing 15 on preventing the swing during the inflation and the deployment will be described in detail below.

Figure 11:
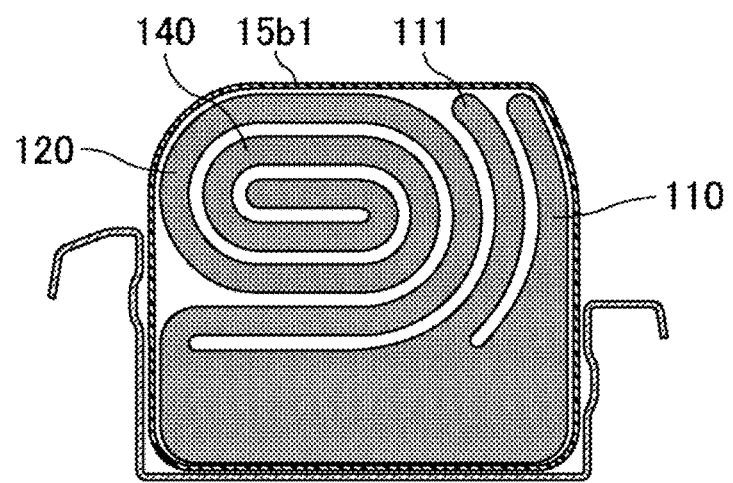
FIG. 11 is a cross-sectional view of the initial state of the airbag device according to the first embodiment, taken along a line C1-C2 on a first region side.
Figure 12:
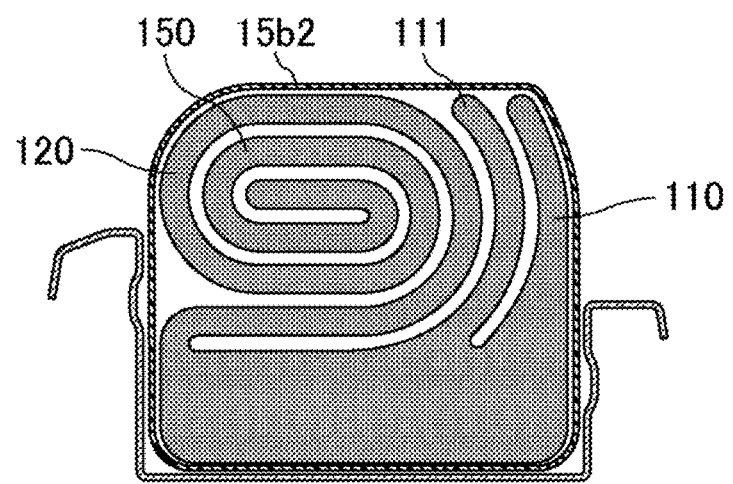
FIG. 12 is a cross-sectional view of the initial state of the airbag device according to the first embodiment, taken along a line D1-D2 on a second region side.
Figure 13:
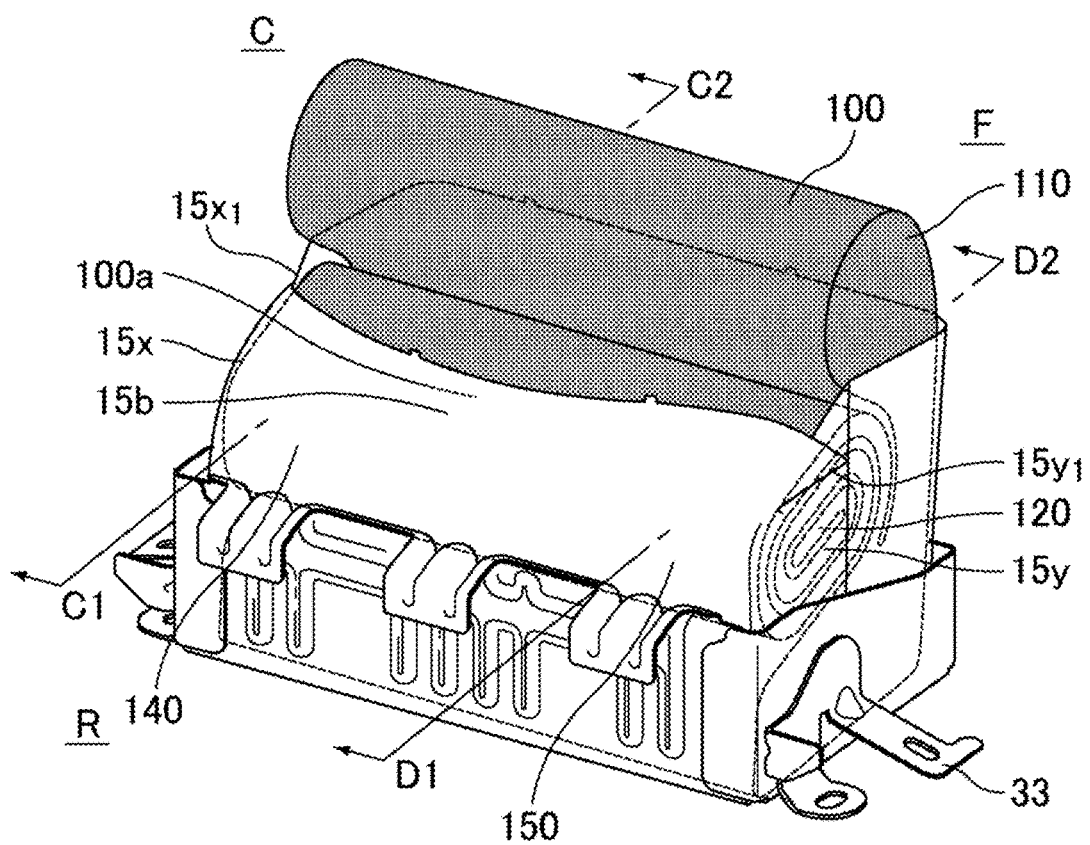
FIG. 13 is a perspective view of the airbag device according to the first embodiment at a time of initial inflation and deployment.
Figure 14:
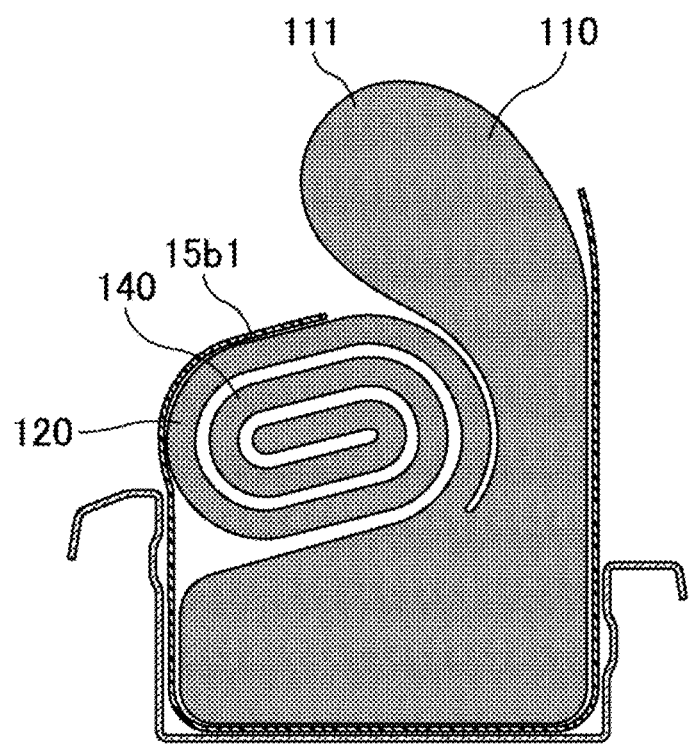
FIG. 14 is a cross-sectional view of the airbag device according to the first embodiment during the initial inflation and deployment, taken along the line C1-C2 on the first region side.
Figure 15:
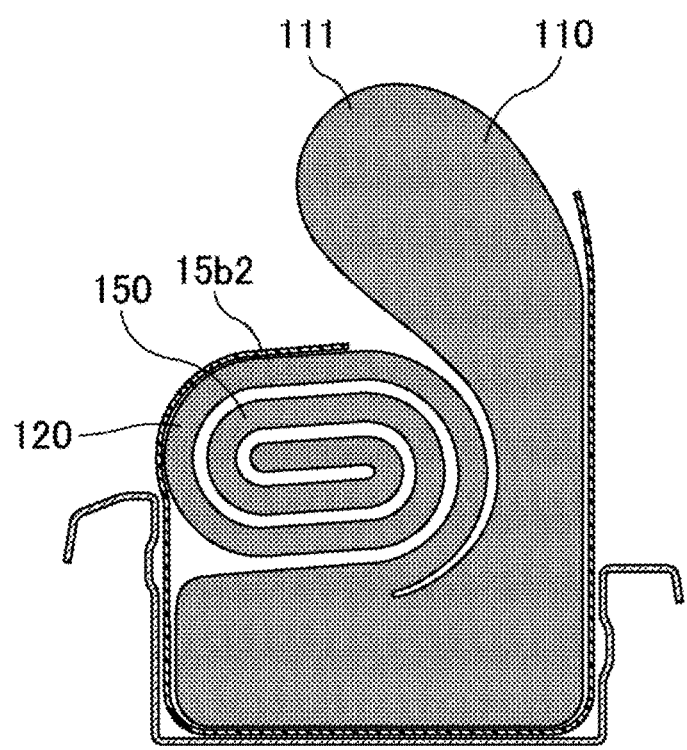
FIG. 15 is a cross-sectional view of the airbag device according to the first embodiment during the initial inflation and deployment, taken along the line D1-D2 on the second region side.

FIGS. 2, 11, and 12 are the perspective view, a cross-sectional view taken along a line C1-C2 on a first region side, and a cross-sectional view taken along a line D1-D2 on a second region side, respectively, in the initial state of the airbag device according to the first embodiment. FIGS. 13 to 15 are a perspective view, a cross-sectional view taken along the line C1-C2 on the first region side, and a cross-sectional view taken along the line D1-D2 on the second region side, respectively, of the airbag device according to the first embodiment during the initial inflation and deployment.

As illustrated in FIGS. 2, 11 to 15, in the present embodiment, the folded airbag 100 includes the first folded portion 110 disposed on the vehicle front side F in the folded airbag 100, and the second folded portion 120 adjacent to the first folded portion 110 and disposed on the vehicle rear side R in the folded airbag 100. The second folded portion 120 is covered with the first region 15b1 and the second region 15b2 of the inhibiting portion 15b. The first region 15b1 is located on one side in the vehicle width direction, and the second region 15b2 is located on the other side in the vehicle width direction. Further, the airbag 100 is tuck-folded in the first folded portion 110, and is folded in the roll shape in the second folded portion 120. With this aspect, the first folded portion 110 not covered with the inhibiting portion 15b and subjected to tuck-folding, which can be more easily unfolded than roll-folding, can be inflated and deployed earlier than the second folded portion 120, and deployed to the outside of the fabric housing 15. Thereafter, the inflation and deployment of the second folded portion 120 folded in the roll shape is also started. In the second folded portion 120, the portion disposed in one region of the first region 15b1 and the second region 15b2 in which the inhibiting force is relatively small can be started to be inflated and deployed first, and the portion disposed in the other region of the first region 15b1 and the second region 15b2 in which the inhibiting force is relatively large can be started to be inflated and deployed later. In the present embodiment, the one region in which the inhibiting force is relatively small corresponds to the first region 15b1, and the other region in which the inhibiting force is relatively large corresponds to the second region 15b2.

As described above, the airbag 100 includes the first inflation portion 140 inflated and deployed on one side with respect to the inflator 11 in the vehicle width direction, and the second inflation portion 150 inflated and deployed on the other side with respect to the inflator 11 in the vehicle width direction. The first inflation portion 140 is inflated and deployed larger than the second inflation portion 150. Further, as illustrated in FIGS. 2, 11, and 12, the first inflation portion 140 of the airbag 100 is disposed in the first region 15b1, and the second inflation portion 150 is disposed in the second region 15b2. The inhibiting force in the first region 15b1 is smaller than the inhibiting force in the second region 15b2.

With this aspect, the first inflation portion 140 inflated and deployed large can be disposed in the first region 15b1 in which the inhibiting force is relatively small, and the second inflation portion 150 inflated and deployed small can be disposed in the second region 15b2 in which the inhibiting force is relatively large. As a result, as illustrated in FIGS. 13 to 15, by delaying a timing at which the second inflation portion 150, which easily comes out of the fabric housing 15 first during the initial inflation and deployment, comes out of the fabric housing 15 during the initial inflation and deployment, it is possible to reduce a difference between a timing at which the first inflation portion 140 comes out of the fabric housing 15 and the timing at which the second inflation portion 150 comes out of the fabric housing 15, and it is possible to prevent the swing of the airbag 100 in the vehicle width direction (left-right direction) during the initial inflation and deployment.

More specifically, when the airbag device 10 illustrated in FIG. 2, in which the folded airbag 100 is housed in the fabric housing 15, is operated due to the collision of the vehicle, the airbag 100 is rapidly inflated by the gas generated by the inflator 11. First, when the gas flows into the airbag 100 in the initial state and the airbag 100 is inflated a little, the lid-side tip end portion 111 is pushed toward a vehicle interior side, ruptures the connecting portions 15d provided in the fabric housing 15, ruptures a tear line (thin portion) of the lid 4, and pushes and opens a deployment door of the lid 4. Specifically, as illustrated in FIGS. 13 to 15, the airbag 100 can come out into the vehicle interior and can be further inflated. At the initial stage of airbag deployment (during the initial inflation and deployment) when the airbag 100 starts to inflate and deploy, the airbag 100 is inflated in an order from a portion where gas easily flows. That is, a vehicle front side portion (the first folded portion 110) folded in the tuck shape that can be easily unfolded is inflated first to rupture the connecting portions 15d, and then a vehicle rear portion (the second folded portion 120 including the first inflation portion 140 and the second inflation portion 150) folded in the roll shape also starts to unfold. Here, the inhibited force of the airbag 100 by the first region 15b1 is smaller than the inhibited force of the airbag 100 by the second region 15b2. Accordingly, during the initial inflation and deployment, the inflation and deployment of the second inflation portion 150 of the airbag 100 on a second region 15b2 side illustrated in FIG. 15 is further delayed than the inflation and deployment of the first inflation portion 140 of the airbag 100 on a first region 15b1 side illustrate in FIG. 14. As a result, as illustrated in FIGS. 13 to 15, by delaying a timing at which the second inflation portion 150, which is inflated and deployed relatively small, comes out of the fabric housing 15 during the initial inflation and deployment, it is possible to reduce a difference between the timing at which the first inflation portion 140 comes out of the fabric housing 15 and the timing at which the second inflation portion 150 comes out of the fabric housing 15, and it is possible to prevent the swing of the airbag 100 in the vehicle width direction (left-right direction) during the initial inflation and deployment.

Figure 16:
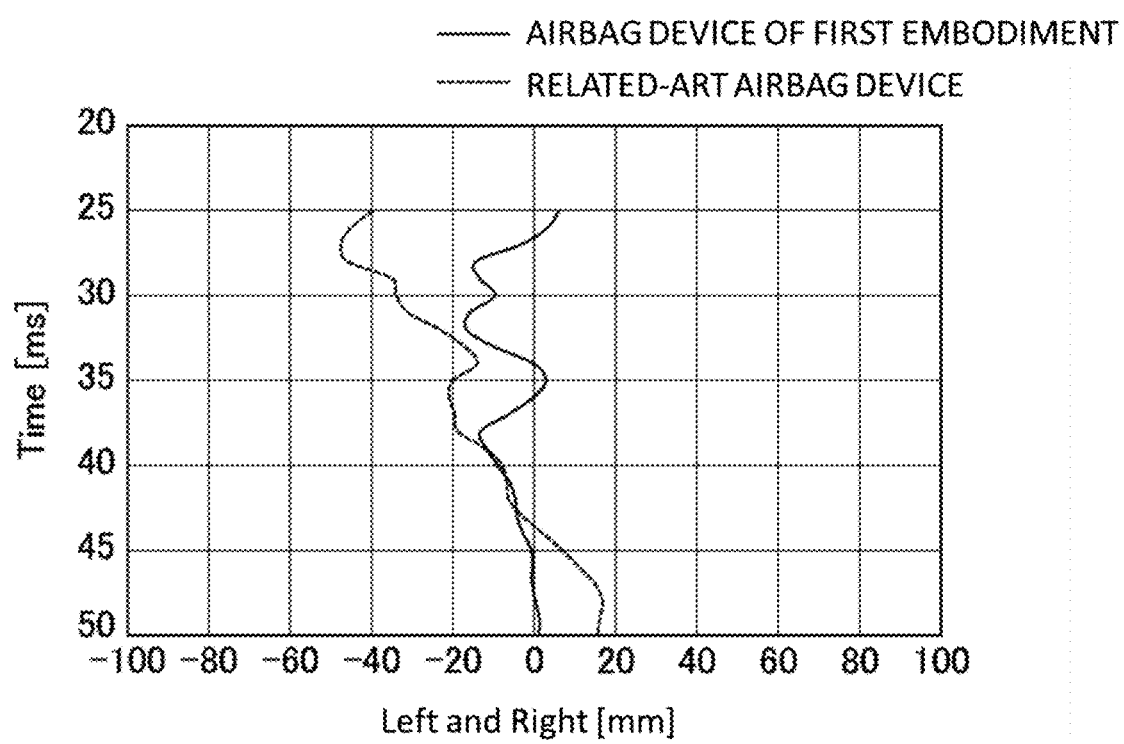
FIG. 16 is a graph illustrating a difference between left-right swing of the airbag device according to the first embodiment and left-right swing of a related-art airbag device during the initial inflation and deployment.

For the airbag devices according to the first embodiment and the related-art airbag device, the swing of the airbag in the vehicle width direction (left-right direction) during the initial inflation and deployment is measured, and results are compared. FIG. 16 is a graph illustrating a difference between the left-right swing of the airbag device according to the first embodiment and the left-right swing of the related-art airbag device during the initial inflation and deployment. In the graph of FIG. 16, a vertical axis illustrates elapsed time after the collision of the vehicle, and measured data after 25 ms to 50 ms is illustrated. In FIG. 16, a horizontal axis is used to indicate a center position, which is a center in a width direction of an occupant receiving portion (occupant receiving portion 160 in FIG. 3) of the airbag that receives the occupant, and a desired center position during inflation and deployment is displayed as 0 mm. The center position of the airbag is determined by measuring movement of targets respectively disposed in the first inflation portion (left air chamber) 140 and the second inflation portion (right air chamber) 150 of the airbag and obtaining a midpoint thereof. In FIG. 16, the smaller an amount of movement in the horizontal axis direction, which is referred to as the measured data, the smaller the swing of the airbag in the left-right direction.

The related-art airbag device illustrated in the graph of FIG. 16 has a similar configuration as the airbag device 10 of the first embodiment except that the inhibiting portion 15b covering the airbag 100 is configured that the same inhibiting force that inhibits the initial inflation and deployment is applied in all regions. In the related-art airbag device, since the second inflation portion (right air chamber) 150 of the airbag is inflated and deployed early, the left-right swing during the initial inflation and deployment shifts to a left side as illustrated in FIG. 16. In contrast, in the airbag device 10 of the present embodiment that has the first region 15b1 and the second region 15b2 where the inhibiting forces that inhibit the initial inflation and deployment are different from each other, since the inhibiting force in the first region 15b1 where the first inflation portion (left air chamber) 140 is disposed is smaller than the inhibiting force in the second region 15b2 where the second inflation portion (right air chamber) 150 is disposed, it is possible to delayed the inflation and deployment of the second expansion portion (right air chamber) 150 which is easily inflated and deployed earlier. As a result, as illustrated in FIG. 16, in the case of the related-art airbag device, the center position is largely moved from a right side to the left side, causing a swing of about 60 mm, whereas in the case of the airbag device 10 according to the present embodiment, the movement of the center position to the left side is reduced and does not deviate significantly from a desired position (0 mm), and the amount of swing is about 20 mm, and it is possible to prevent the left-right swing during the initial inflation and deployment.

As illustrated in FIGS. 2 and 3, in the present embodiment, the airbag 100 includes two protruding portions (i.e. first protruding portion 141 and second protruding portion 151) that protrude toward the vehicle rear side R due to inflation and deployment, and the first protruding portion 141 is inflated larger than the second protruding portion 151. When the two protruding portions are folded and covered with the fabric housing 15, the first protruding portion 141 is located in the first region 15b1 of the inhibiting portion 15b, the second protruding portion 151 is located in the second region 15b2, and the inhibiting force in the first region 15b1 is smaller than that in the second region 15b2. With this aspect, the first protruding portion 141 that is inflated relatively large can be disposed in the first region 15b1 in which the inhibiting force is relatively small, and the second protruding portion 151 that is inflated relatively small can be disposed in the second region 15b2 in which the inhibiting force is relatively large. As a result, a timing at which the second protruding portion 151, which is easily deployed from the fabric housing 15 first during the initial inflation and deployment, comes out of the fabric housing 15 during the initial inflation and deployment is delayed in order to make the inflation relatively small. Thus, it is possible to reduce a difference between a timing at which the first protruding portion 141 comes out of the fabric housing 15 and the timing at which the second protruding portion 151 comes out of the fabric housing 15, and it is possible to prevent the swing of the airbag 100 in the vehicle width direction (left-right direction) during the initial inflation and deployment.

Next, the fabric housing 15 will be described in more detail. As illustrated in FIGS. 1, 2 and 13, the fabric housing 15 includes an inhibiting portion 15b that covers a part of the airbag 100 from the occupant side C opposite the attachment portion 15a of the folded airbag 100 and that partially inhibits the initial inflation and deployment of the airbag 100, a first side wall portion 15x adjacent to the one end portion of the inhibiting portion 15b in the vehicle width direction, and a second side wall portion 15y adjacent to the other end portion of the inhibiting portion 15b in the vehicle width direction. A first sewn portion 15x1 where a common base fabric constituting the inhibiting portion 15b and the first side wall portion 15x is sewn is provided at a boundary between the inhibiting portion 15b and the first side wall portion 15x, and a second sewn portion 15y1 where a common base fabric constituting the inhibiting portion 15b and the second side wall portion 15y is sewn is provided at a boundary between the inhibiting portion 15b and the second side wall portion 15y. The length of the first sewn portion 15x1 is different from the length of the second sewn portion 15y1. With this aspect, it is possible to realize different inhibiting forces on the first side wall portion 15x side and the second side wall portion 15y side of the inhibiting portion 15b. That is, when the folded airbag 100 provided in the airbag device is viewed in a plan view from the occupant side C opposite the attachment portion 15a, the airbag 100 covered with the inhibiting portion 15b is covered with the first region 15b1 and the second region 15b2 where the inhibiting forces that inhibit the initial inflation and deployment are different from each other. As a result, it is possible to control the timing of inflation and deployment in the first direction Z1 in which both a region 15bx covered with the inhibiting portion 15b and a region 15by not covered with the inhibiting portion 15b are included, and it is possible to control the timing of inflation and deployment in the second direction Z2 in which both the first region 15b1 and the second region 15b2 of the inhibiting portion 15b are included. As described above, in the present embodiment, it is possible to control the timing of the inflation and deployment of the airbag 100 in two directions.

In the present embodiment, the first inflation portion 140 of the airbag 100 that is inflated and deployed relatively large is located on the first side wall portion 15x side of the fabric housing 15, and the second inflation portion 150 of the airbag 100 that is inflated and deployed relatively small is located on the second side wall portion 15y side of the fabric housing 15. The length of the first sewn portion 15x1 is shorter than the length of the second sewn portion 15y1. With this aspect, the first region 15b1 where the inhibiting force is relatively small can be provided on the first side wall portion 15x side of the inhibiting portion 15b, and the second region 15b2 where the inhibiting force is relatively large can be provided on the second side wall portion 15y side of the inhibiting portion 15b. As a result, the first inflation portion 140 inflated and deployed relatively large is located in the first region 15b1 where the inhibiting force is relatively small, and the second inflation portion 150 inflated and deployed relatively small is located in the second region 15b2 where the inhibiting force is relatively large. Therefore, the timing at which the second inflation portion 150, which easily comes out of the fabric housing 15 first during the initial inflation and deployment, comes out of the fabric housing 15 during the initial inflation and deployment is delayed in order to make the inflation and deployment relatively small. Thus, it is possible to reduce a difference between the timing at which the first inflation portion 140 comes out of the fabric housing 15 and the timing at which the second inflation portion 150 comes out of the fabric housing 15, and it is possible to prevent the swing of the airbag 100 in the vehicle width direction (left-right direction) during the initial inflation and deployment.

Next, a sewing procedure of the fabric housing 15 will be described. FIGS. 17 to 21 are plan views illustrating sewing steps (1) to (6) of the fabric housing according to the first embodiment.

Figure 17:
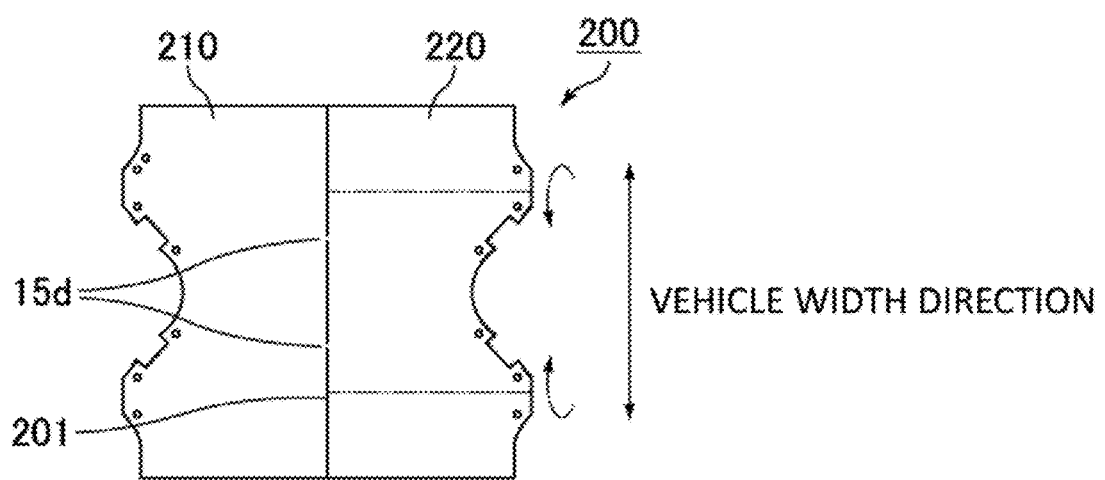
FIG. 17 is a plan view illustrating a sewing step (1) of the fabric housing according to the first embodiment.

The fabric housing 15 is obtained by sewing a base fabric 200 illustrated in FIG. 17. The base fabric 200 includes a first flat portion 210 and a second flat portion 220 arranged side by side in a direction perpendicular to the vehicle width direction. The first flat portion 210 and the second flat portion 220 have a shape substantially line-symmetrical with respect to an axis of symmetry 201 along the vehicle width direction, and are connected to each other by two connecting portions 15d on the axis of symmetry 201.

Figure 18:
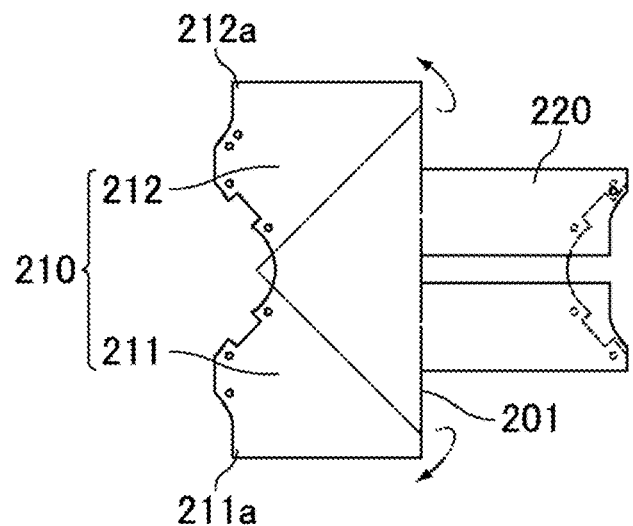
FIG. 18 is a plan view illustrating a sewing step (2) of the fabric housing according to the first embodiment.

In the sewing step (1), as illustrated in FIG. 17, both end portions of the second flat portion 220 of the base fabric 200 in the vehicle width direction are folded such that the dimension in the vehicle width direction is shortened. Specifically, in the sewing step (1), as illustrated in FIG. 17, both end portions of the second flat portion 220 in the vehicle width direction are valley-folded toward the center of the axis of symmetry 201, and a state illustrated in FIG. 18 is obtained. By shortening the length of the second flat portion 220 in the vehicle width direction in this way, it becomes easier to sew a corner portion of the first flat portion 210, which will be described below.

Figure 19:
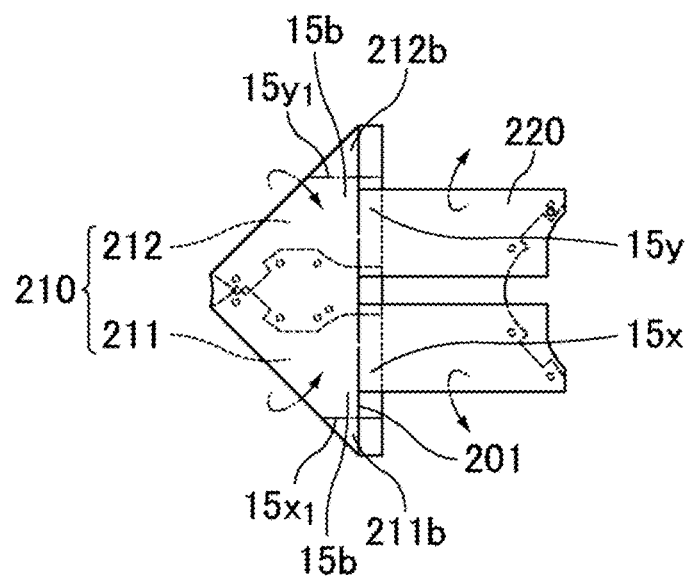
FIG. 19 is a plan view illustrating sewing steps (3) and (4) of the fabric housing according to the first embodiment.

Subsequently, in the sewing step (2), one side 211 and the other side 212 of the first flat portion 210 in the vehicle width direction are folded diagonally toward the axis of symmetry 201 (preferably, an angle of each crease with respect to the axis of symmetry 201 is 45 degrees). Specifically, in the sewing step (2), as illustrated in FIG. 18, a corner portion 211a located on the one side 211 of the first flat portion 210 and on a side far from the axis of symmetry 201 is aligned with the vicinity of the center of the axis of symmetry 201, and the one side 211 is mountain-folded, and as illustrated in FIG. 19, a triangular corner portion 211b where base fabrics on the one side 211 partially overlap each other is formed at an end portion near the axis of symmetry 201. Similarly, a corner portion 212a located on the other side 212 of the first flat portion 210 and on a side far from the axis of symmetry 201 is aligned with the vicinity of the center of the axis of symmetry 201, and the other side 212 is mountain-folded, and as illustrated in FIG. 19, a triangular corner portion 212b where base fabrics on the other side 212 partially overlap each other is formed at an end portion near the axis of symmetry 201. As described above, a state illustrated in FIG. 19 is obtained. The state illustrated in FIG. 19 is that the two triangular corners 211b, 212b are not sewn.

Subsequently, in the sewing step (3), as illustrated in FIG. 19, two fabrics overlapping at the triangular corner portion 211b are sewn to form the first sewn portion 15x1, and two fabrics overlapping at the triangular corner portion 212b are sewn to form the second sewn portion 15y1. Here, as illustrated in FIG. 19, the inhibiting portions 15b are formed in the vicinity of the axis of symmetry 201 of the one side 211 and the vicinity of the axis of symmetry 201 of the other side 212, and at least a part of the one side 211 folded by the mountain fold forms the first side wall portion 15x, and at least a part of the other side 212 folded by the mountain fold forms the second side wall portion 15y. Therefore, in the sewing step (3), the first sewn portion 15x1 becomes a sewn portion in which the common base fabrics constituting the inhibiting portion 15b and the first side wall portion 15x are sewn together while being mountain-folded, and the second sewn portion 15y1 becomes a sewn portion in which the common base fabrics constituting the inhibiting portion 15b and the second side wall portion 15y are sewn together while being mountain-folded. As will be described below, in the sewing of the fabric housing 15 of the present embodiment, since the base fabric 200 is finally folded back such that an inner surface faces an outer side, in the completed fabric housing 15, the first sewn portion 15x1 becomes a sewn portion in which the common base fabrics constituting the inhibiting portion 15b and the first side wall portion 15x are sewn together while being valley-folded toward an inside of the fabric housing 15, and the second sewn portion 15y1 becomes a sewn portion in which the common base fabrics constituting the inhibiting portion 15b and the second side wall portion 15y are sewn together while being valley-folded toward the inside of the fabric housing 15.

Figure 20:
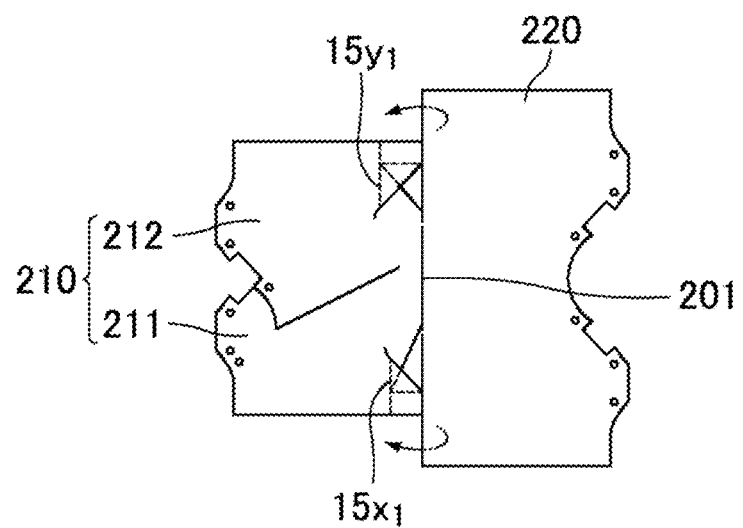
FIG. 20 is a plan view illustrating a sewing step (5) of the fabric housing according to the first embodiment.

Subsequently, in the sewing step (4), as illustrated in FIG. 19, the folded one side 211 and the other side 212 of the first flat portion 210 are deployed, and the folding of the second flat portion 220 in the vehicle width direction is deployed, so that a state illustrated in FIG. 20 is obtained.

Figure 21:
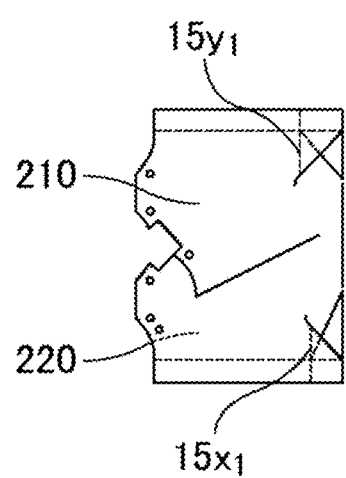
FIG. 21 is a plan view illustrating a sewing step (6) of the fabric housing according to the first embodiment.

Subsequently, in the sewing step (5), as illustrated in FIG. 20, both end portions of the second flat portion 220 in the vehicle width direction are mountain-folded along the axis of symmetry 201 so as to match both end portions of the first flat portion 210 in the vehicle width direction, respectively, and the first flat portion 210 and the second flat portion 220 are overlapped with each other, so that a state illustrated in FIG. 21 is obtained. The state illustrated in FIG. 21 is that the first flat surface portion 210 and the second flat surface portion 220 are not sewn to each other.

Subsequently, in the sewing step (6), as illustrated in FIG. 21, both end portions in the vehicle width direction where the first flat surface portion 210 and the second flat surface portion 220 are overlapped are sewn, and the first flat portion 210 and the second flat portion 220 are sewn together. Finally, the base fabric 200 is folded back such that the inner surface faces the outer side, and the fabric housing 15 is formed. Then, as illustrated in FIG. 10 described above, the folded airbag 100 is housed in the fabric housing 15. By reversing the fabric housing 15 after sewing the fabric housing 15 in this way, it is possible to prevent the triangular corner portions 211b, 212b from getting in the way when the fabric housing 15 is attached to the vehicle or the lid 4.

As described above, according to the present embodiment, the fabric housing 15 as a holding member includes the inhibiting portion 15b that covers a part of the folded airbag 100 from the occupant side C and that partially inhibits the initial inflation and deployment of the airbag 100, and the inhibiting portion 15b has the first region 15b1 and the second region 15b2 where the inhibiting forces that inhibit the inflation and deployment are different from each other. With this aspect, the initial inflation and deployment of the airbag 100 located in the region 15bx covered with the inhibiting portion 15b can be further inhibited than the initial inflation and deployment of the airbag located in the region 15by not covered with the inhibiting portion 15b. That is, it is possible to control the timing of inflation and deployment in the first direction Z1 in which both the region 15bx covered with the inhibiting portion 15b and the region 15by not covered with the inhibiting portion 15b are included. Since the airbag 100 covered with the inhibiting portion 15b has the first region 15b1 and the second region 15b2 where the inhibiting forces that inhibit the initial inflation and deployment are different from each other, the initial inflation and deployment of the airbag 100 in one region of the first region 15b1 and the second region 15b2 can be further inhibited than the initial inflation and deployment in the other region. That is, it is possible to control the timing of inflation and deployment in the second direction Z2 in which both the first region 15b1 and the second region 15b2 covered with the inhibiting portion 15b are included. As described above, in the present embodiment, it is possible to control the timing of inflation and deployment of the airbag 100 in two directions.

Second Embodiment

The structure of the holding member in an airbag device according to a second embodiment is different from that of the airbag device according to the first embodiment. That is, in the second embodiment, the holding member including the inhibiting portion that partially inhibits the initial inflation and deployment of the airbag is not a housing that covers the folded airbag 100, but a band shaped member that partially holds the folded airbag 100. When the band shaped member is provided, a usual housing for housing the airbag may not be provided, or may be provided together with the band shaped member.

Figure 22:
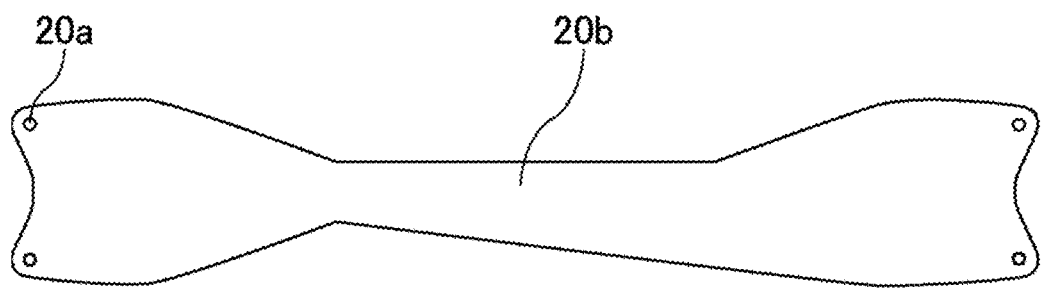
FIG. 22 is a developed view of a band shaped member according to a second embodiment.
Figure 23:
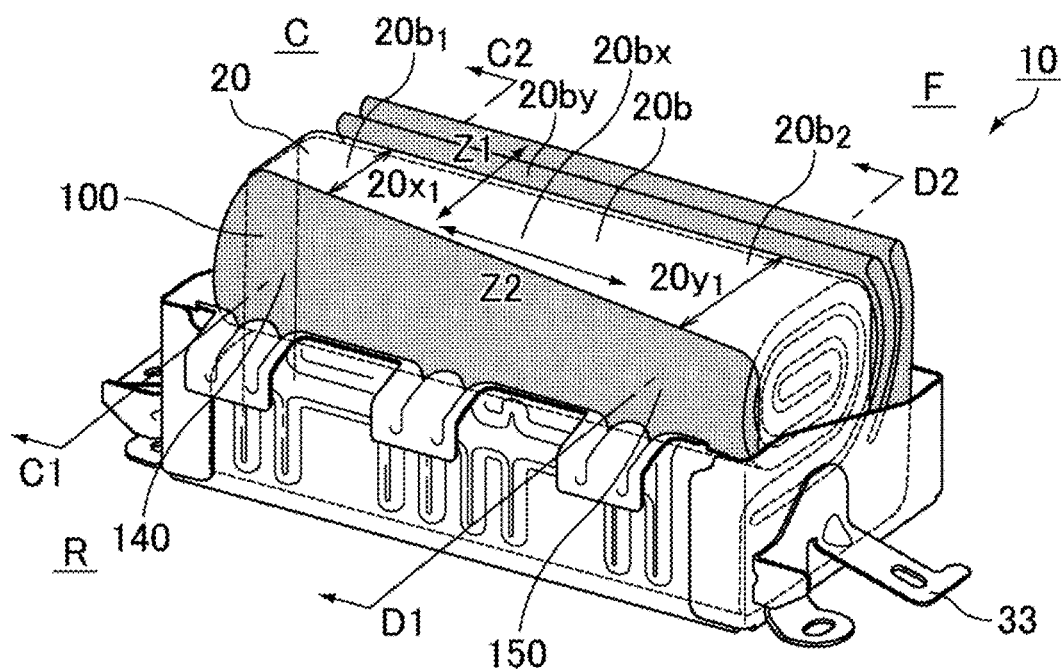
FIG. 23 is a perspective view of an initial state of an airbag device according to the second embodiment.
Figure 24:
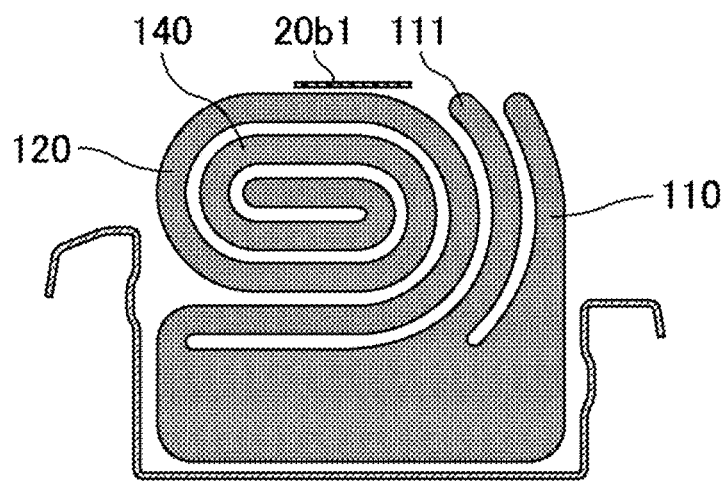
FIG. 24 is a cross-sectional view of the initial state of the airbag device according to the second embodiment, taken along the line C1-C2 on a first region side.
Figure 25:
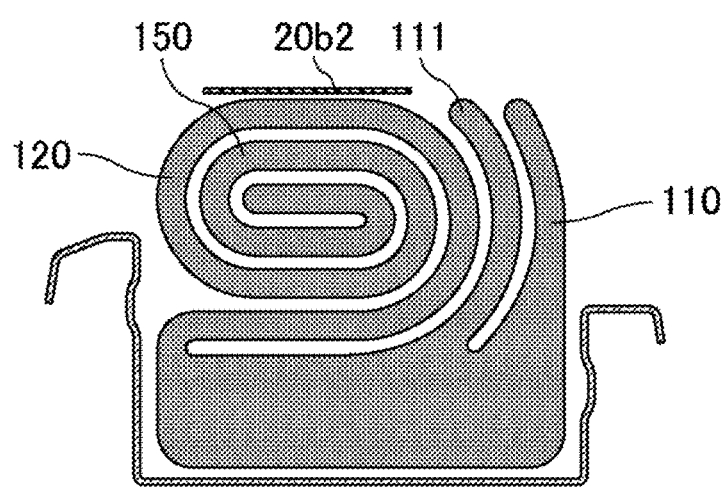
FIG. 25 is a cross-sectional view of the initial state of the airbag device according to the second embodiment, taken along the line D1-D2 on a second region side.
Figure 26:
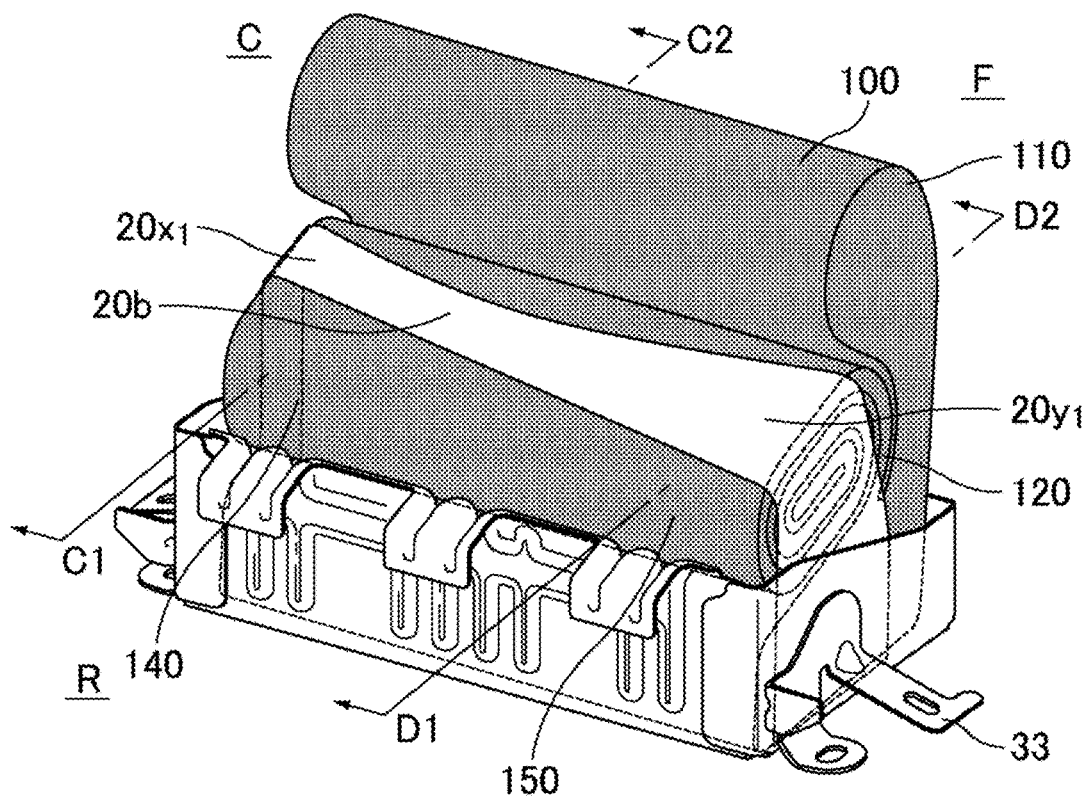
FIG. 26 is a perspective view of the airbag device according to the second embodiment at a time of initial inflation and deployment.
Figure 27:
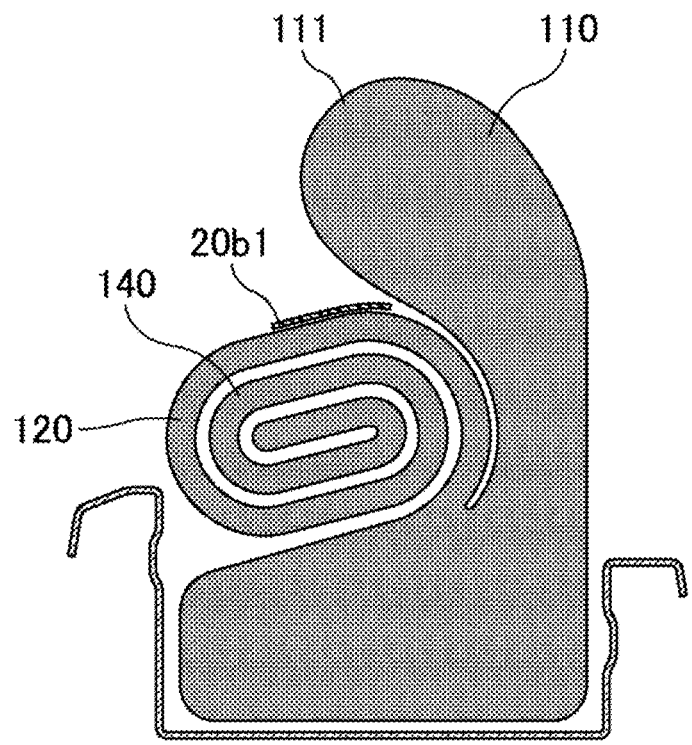
FIG. 27 is a cross-sectional view of the airbag device according to the second embodiment during the initial inflation and deployment, taken along the line C1-C2 on the first region side.
Figure 28:
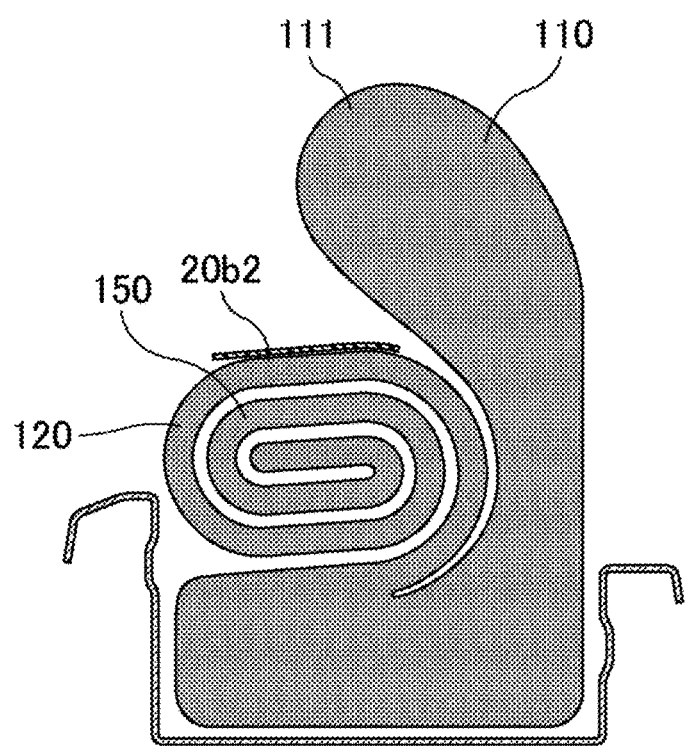
FIG. 28 is a cross-sectional view of the airbag device according to the second embodiment during the initial inflation and deployment, taken along the line D1-D2 on the second region side.

The airbag device 10 according to the second embodiment will be described in detail with reference to FIGS. 22 to 28. FIG. 22 is a developed view of the band shaped member according to the second embodiment. FIGS. 23 to 25 are a perspective view, a cross-sectional view taken along the line C1-C2 on a first region side, and a cross-sectional view taken along the line D1-D2 on a second region side, respectively, in an initial state of the airbag device according to the second embodiment. FIGS. 26 to 28 are a perspective view, a cross-sectional view taken along the line C1-C2 on the first region side, and a cross-sectional view taken along the line DI-D2 on the second region side, respectively, of the airbag device according to the second embodiment during the initial inflation and deployment.

As illustrated in FIGS. 23 to 25, a band shaped member 20 as the holding member of the present embodiment includes attachment portions 20a to which the inflator is attached, and holds the folded airbag 100 from the occupant side C opposite the attachment portion 20a. The airbag 100 is inflated and deployed from a position of the band shaped member 20 opposite the attachment portions 20a.

In the present embodiment, the airbag 100 is provided with a portion that is inflated without being restricted by the band shaped member 20 and a portion that is inflated under the restriction of the band shaped member 20 from immediately after the start of the inflation to the initial inflation and deployment. In the case of FIGS. 23 to 25, the first folded portion 110 disposed on the vehicle front side F corresponds to the portion that is inflated without being restricted by the band shaped member 20, and the second folded portion 120 adjacent to the first folded portion 110 and disposed on the vehicle rear side R in the folded airbag 100 corresponds to the portion that is inflated under the restriction of the band shaped member 20. The band shaped member 20 includes an inhibiting portion 20b that covers a part of the airbag 100 from the occupant side C opposite the attachment portion 20a of the folded airbag 100, and that partially inhibits the initial inflation and deployment of the airbag 100. The inhibiting portion 20b is a portion having a function of inhibiting the initial inflation and deployment of the airbag 100. When the folded airbag 100 is viewed from the occupant side C, a region 20bx covered with the inhibiting portion 20b and a region 20by not covered with the inhibiting portion 20b are arranged so as to face each other in the vehicle front-rear direction, the region 20bx covered with the inhibiting portion 20b is disposed on the vehicle rear side R, and the region 20by not covered with the inhibiting portion 20b is disposed on the vehicle front side F.

In the present embodiment, the band shaped member 20 is provided in the band shape along the vehicle width direction in the vicinity of a center of the occupant side C. A position of the band shaped member 20 is deviated to the vehicle rear side R in the surface of the occupant side C by the pressure of the airbag 100 that is inflated and deployed immediately after the start of the inflation, and the airbag is more likely to inflate at the vehicle front side F in the surface of the occupant side C of the band shaped member 20. Thus, the first folded portion 110 of the airbag 100 is deployed outside the band shaped member 20.

On the other hand, the inhibiting portion 20b included in the band shaped member 20 inhibits the initial inflation and deployment of the second folded portion 120 of the airbag 100. In the band shaped member 20, a width 20x1 of one end portion of the inhibiting portion 20b in the vehicle width direction and a width 20y1 of the other end portion of the inhibiting portion 20b in the vehicle width direction are different from each other. With this aspect, it is possible to realize different inhibiting forces at one end portion and the other end portion of the inhibiting portion 20b. That is, the folded inhibiting portion 20b provided in the airbag device 10 can have a first region 20b1 and a second region 20b2 where inhibiting forces that inhibit the initial inflation and deployment are different from each other. As a result, it is possible to control the timing of inflation and deployment in the first direction Z1 in which both the region 20bx covered with the inhibiting portion 20b and the region 20by not covered with the inhibiting portion 20b are included, and it is possible to control the timing of inflation and deployment in the second direction Z2 in which both the first region 20b1 and the second region 20b2 covered with the inhibiting portion 20b are included. As described above, in the present embodiment, it is possible to control the timing of the inflation and deployment of the airbag 100 in two directions.

Specifically, as described above, the airbag 100 includes the first inflation portion 140 inflated and deployed on one side with respect to the inflator 11 in the vehicle width direction, and the second inflation portion 150 inflated and deployed on the other side with respect to the inflator 11 in the vehicle width direction. The first inflation portion 140 is inflated and deployed larger than the second inflation portion 150. Further, as illustrated in FIGS. 23 to 25, the first inflation portion 140 of the airbag 100 is located in the first region 20b1, and the second inflation portion 150 is located in the second region 20b2. The inhibiting force in the first region 20b1 is smaller than the inhibiting force in the second region 20b2. With this aspect, the first inflation portion 140 inflated and deployed relatively large can be disposed in the first region 20b1 in which the inhibiting force is relatively small, and the second inflation portion 150 inflated and deployed relatively small can be disposed in the second region 20b2 in which the inhibiting force is relatively large. As a result, as illustrated in FIGS. 26 to 28, the timing at which the second inflation portion 150, which easily comes out of the band shaped member 20 first during the initial inflation, comes out of the fabric housing 15 during the initial inflation and deployment is delayed in order to make the inflation and deployment relatively small. Thus, it is possible to reduce a difference between the timing at which the first inflation portion 140 comes out of the band shaped member 20 and the timing at which the second inflation portion 150 comes out of the band shaped member 20, and it is possible to prevent the swing of the airbag 100 in the vehicle width direction (left-right direction) during the initial inflation and deployment.

More specifically, when the airbag device 10, in which the folded airbag 100 is held by the band shaped member 20, is operated due to the collision of the vehicle, the airbag 100 is rapidly inflated by the gas generated by the inflator 11. First, when the gas flows into the airbag 100 in the initial state and the airbag 100 is inflated a little, the lid-side tip end portion 111 is pushed toward the vehicle interior side, and the band shaped member 20 is deformed. Accordingly, as illustrated in FIGS. 26 to 28, the airbag 100 can come out into the vehicle interior and can be further inflated. At the initial stage of the airbag deployment (during the initial inflation and deployment) when the airbag 100 starts to inflate and deploy, the airbag 100 is inflated in an order from the portion where gas easily flows. That is, the tuck-folded vehicle front side portion (the first folded portion 110) which can be easily unfolded is inflated first to deform the band shaped member 20, and then the vehicle rear portion (the second folded portion 120 including the first inflation portion 140 and the second inflation portion 150) folded in the roll shape is also unfolded. Here, the inhibited force of the airbag 100 by the first region 20b1 is smaller than the inhibited force of the airbag 100 by the second region 20b2. Further, during the initial inflation and deployment, the inflation and deployment of the second inflation portion 150 of the airbag 100 on a second region 20b2 side illustrated in FIG. 28 is further delayed than the inflation and deployment of the first inflation portion 140 of the airbag 100 on a first region 20b1 side illustrated in FIG. 27. As a result, as illustrated in FIGS. 26 to 28, a timing at which the second inflation portion 150, which is inflated and deployed relatively small, comes out of the band shaped member 20 during the initial inflation and deployment is delayed. Thus, it is possible to reduce a difference between the timing at which the first inflation portion 140 comes out of the band shaped member 20 and the timing at which the second inflation portion 150 comes out of the band shaped member, and it is possible to prevent the swing of the airbag 100 in the vehicle width direction (left-right direction) during the initial inflation and deployment.

(First Modification)

Figure 29:
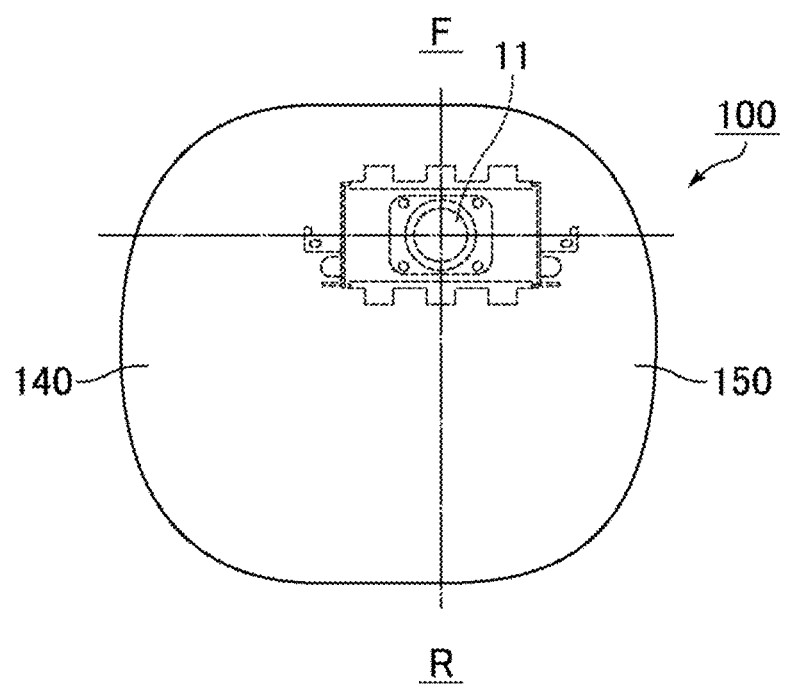
FIG. 29 is a diagram illustrating a state in which an airbag according to a first modification is inflated and deployed when viewed from above the vehicle.

In the airbag 100 provided in the airbag devices 10 according to the first and second embodiments, the inflator 11 is disposed at the center in the vehicle width direction, and the first inflation portion 140 and the second inflation portion 150 are disposed on one side and the other side with respect to the inflator 11, respectively. The first inflation portion 140 and the second inflation portion 150 include the first protruding portion 141 and the second protruding portion 151, respectively, but the shape of the airbag 100 is not limited thereto. FIG. 29 is a diagram illustrating a state in which an airbag according to a first modification is inflated and deployed when viewed from above the vehicle. For example, as illustrated in the airbag 100 of this modification in FIG. 29, the inflator 11 may be disposed closer to the other side with respect to the center in the vehicle width direction, namely, the first inflation portion 140 and the second inflation portion 150 may be disposed asymmetrically with respect to the inflator 11, and the first inflation portion 140 and the second inflation portion 150 each may not include a protruding portion. With this aspect, the first inflation portion 140, which is inflated and deployed larger than the second inflation portion 150, can be disposed on a first region side which has a smaller inhibiting force than the second region, and the second inflation portion 150, which is inflated and deployed smaller than the first inflation portion 140, can be disposed on a second region side which has a larger inhibiting force than the first region. As a result, a timing at which the second inflation portion 150, which is inflated and deployed relatively small, comes out of the holding member during the initial inflation and deployment is delayed. Thus, it is possible to reduce a difference between the timing at which the first inflation portion 140 comes out of the holding member and the timing at which the second inflation portion 150 comes out of the holding member, and it is possible to prevent the swing of the airbag 100 in the vehicle width direction (left-right direction) during the initial inflation and deployment.

(Second Modification)

Figure 30:
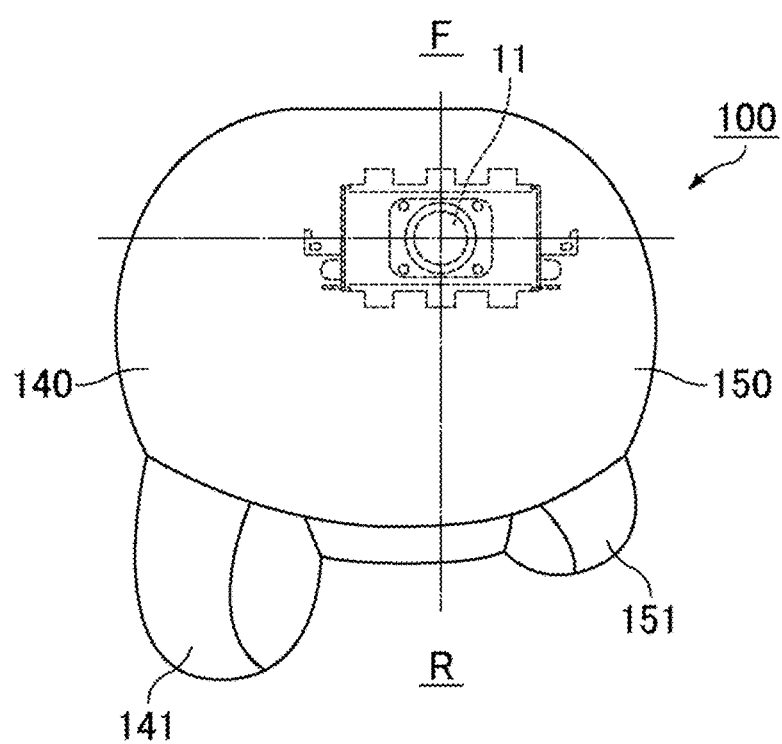
FIG. 30 is a diagram illustrating a state in which an airbag according to a second modification is inflated and deployed when viewed from above the vehicle.

FIG. 30 is a diagram illustrating a state in which an airbag according to a second modification is inflated and deployed when viewed from above the vehicle. In the airbag 100 of this modification in FIG. 30, the inflator 11 is disposed closer to the other side with respect to the center in the vehicle width direction, namely, the first inflation portion 140 and the second inflation portion 150 are disposed asymmetrically with respect to the inflator 11, and the first inflation portion 140 and the second inflation portion 150 include the first protruding portion 141 and the second protruding portion 151, respectively. With this aspect, the first inflation portion 140, which is inflated and deployed relatively large, can be disposed on the first region side in which the inhibiting force is relatively small, and the second inflation portion 150, which is inflated and deployed relatively small, can be disposed on the second region side in which the inhibiting force is relatively large. As a result, the timing at which the second inflation portion 150, which is inflated and deployed relatively small, comes out of the holding member during the initial inflation and deployment is delayed. Thus, it is possible to reduce the difference between the timing at which the first inflation portion 140 comes out of the holding member and the timing at which the second inflation portion 150 comes out of the holding member, and it is possible to prevent the swing of the airbag 100 in the vehicle width direction (left-right direction) during the initial inflation and deployment. Further, since the first protruding portion 141 and the second protruding portion 151 are provided in the airbag 100, it is possible to further reduce the deviating of the occupant from the airbag 100 toward the vehicle center side and the vehicle outer side and to more appropriately protect the occupant.

(Third Modification)

Figure 31:
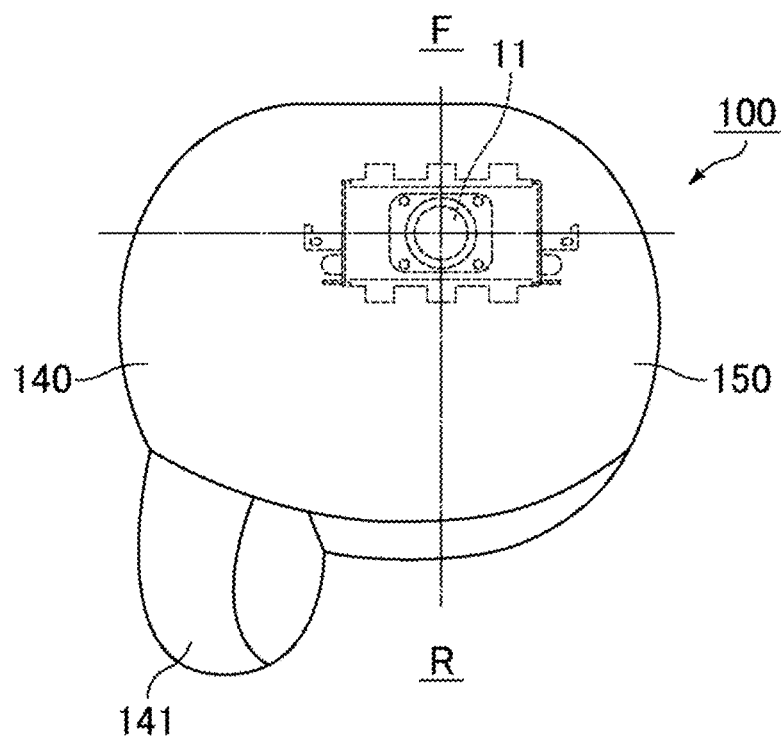
FIG. 31 is a diagram illustrating a state in which an airbag according to a third modification is inflated and deployed when viewed from above the vehicle.

FIG. 31 is a diagram illustrating a state in which an airbag according to a third modification is inflated and deployed when viewed from above the vehicle. In the airbag 100 of this modification in FIG. 31, the inflator 11 is disposed closer to the other side with respect to the center in the vehicle width direction, namely, the first inflation portion 140 and the second inflation portion 150 may be disposed asymmetrically with respect to the inflator 11, and the first inflation portion 140 includes the first protruding portion 141 and the second inflation portion 150 does not include a protruding portion. With this aspect, the first inflation portion 140, which is inflated and deployed relatively large, can be disposed on the first region side in which the inhibiting force is relatively small, and the second inflation portion 150, which is inflated and deployed relatively small, can be disposed on the second region side in which the inhibiting force is relatively large. As a result, the timing at which the second inflation portion 150, which is inflated and deployed relatively small, comes out of the holding member during the initial inflation and deployment is delayed. Thus, it is possible to reduce the difference between the timing at which the first inflation portion 140 comes out of the holding member and the timing at which the second inflation portion 150 comes out of the holding member, and it is possible to prevent the swing of the airbag 100 in the vehicle width direction (left-right direction) during the initial inflation and deployment. Further, since the first protruding portion 141 is provided in the airbag 100, it is possible to further reduce the deviating of the occupant from the airbag 100 toward the vehicle center side and to more appropriately protect the occupant.

(Fourth Modification)

Figure 32:
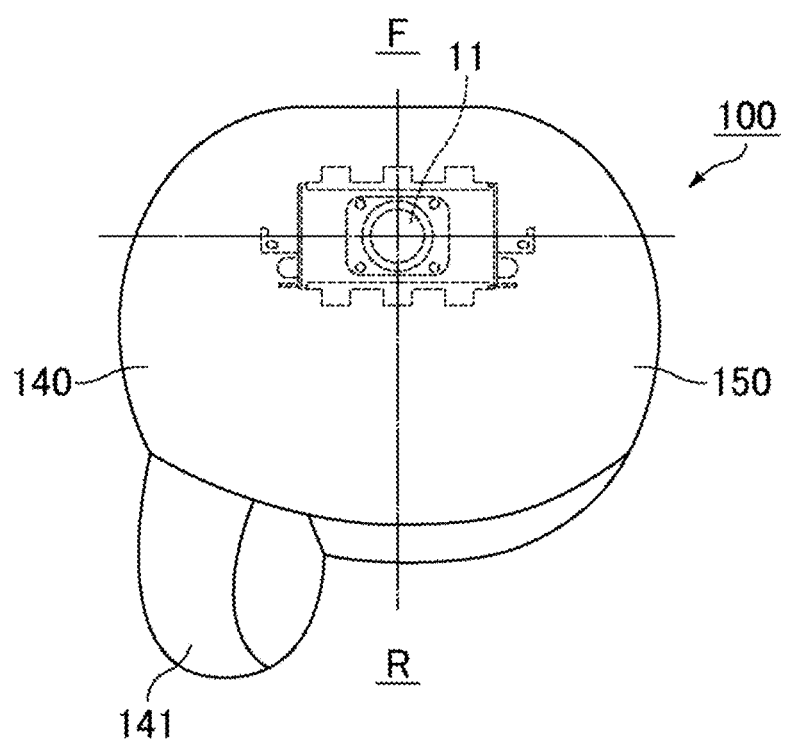
FIG. 32 is a diagram illustrating a state in which an airbag according to a fourth modification is inflated and deployed when viewed from above the vehicle.

FIG. 32 is a diagram illustrating a state in which an airbag according to a fourth modification is inflated and deployed when viewed from above the vehicle. In the airbag 100 of this modification in FIG. 32, the inflator 11 is disposed at the center in the vehicle width direction, namely, the first inflation portion 140 and the second inflation portion 150 is disposed symmetrically with respect to the inflator 11, and the first inflation portion 140 includes the first protruding portion 141 and the second inflation portion 150 does not include a protruding portion. With this aspect, the first inflation portion 140, which is inflated and deployed relatively large, can be disposed on the first region side in which the inhibiting force is relatively small, and the second inflation portion 150, which is inflated and deployed relatively small, can be disposed on the second region side in which the inhibiting force is relatively large. As a result, the timing at which the second inflation portion 150, which is inflated and deployed relatively small, comes out of the holding member during the initial inflation and deployment is delayed. Thus, it is possible to reduce the difference between the timing at which the first inflation portion 140 comes out of the holding member and the timing at which the second inflation portion 150 comes out of the holding member, and it is possible to prevent the swing of the airbag 100 in the vehicle width direction (left-right direction) during the initial inflation and deployment. Further, since the first protruding portion 141 is provided in the airbag 100, it is possible to further reduce the deviating of the occupant from the airbag 100 toward the vehicle center side and to more appropriately protect the occupant.

(Fifth Modification)

Figure 33:
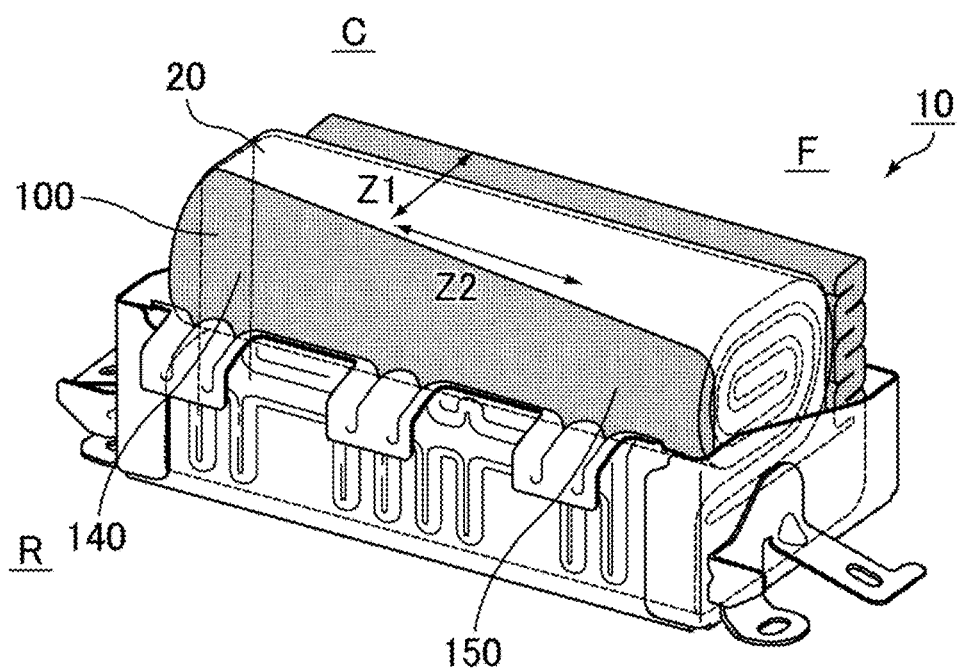
FIG. 33 is a perspective view illustrating an initial state of an airbag device according to a fifth modification.

In the airbag 100 provided in the airbag devices 10 according to the first and second embodiments, the first folded portion 110 is tuck-folded, but the folding method of the first folded portion 110 is not limited thereto. FIG. 33 is a perspective view illustrating an initial state of an airbag device according to a fifth modification. For example, the first folded portion 110 may be bellows-folded as illustrated in FIG. 33. With this aspect, the first folded portion 110 that is subjected to bellows-folding, which can be more easily unfolded than roll-folding, can be inflated and deployed earlier than the second folded portion 120, and deployed to the outside of the holding member (the fabric housing 15 or the band shaped member 20).

(Sixth Modification)

In the airbag 100 provided in the airbag devices 10 according to the first and second embodiments, the first side region 101 and the second side region 102 are each bellows-folded to shorten the dimension in the vehicle width direction, but the folding method of the first side region 101 and the second side region 102 is not limited thereto. For example, the first side region 101 and the second side region 102 may be tuck-folded. When the first side region 101 and the second side region 102 are tuck-folded, an effect similar to the case of bellows-folding can be obtained.

(Seventh Modification)

In the first embodiment, when the fabric housing 15 is sewn, since the base fabric 200 is sewn and then inverted, the first sewn portion $15x1$ provided at the boundary between the inhibiting portion $15b$ and the first side wall portion $15x$ is a sewn portion in which the common base fabrics constituting the inhibiting portion $15b$ and the first side wall portion $15x$ are sewn together while being valley-folded toward the inside of the fabric housing 15, but the aspect of the sewn portion $15x1$ is not limited thereto. When sewing the fabric housing 15, it is not necessary to invert the base fabric 200 after sewing the base fabric 200, and in this case, the first sewn portion $15x1$ is a sewn portion in which the common base fabrics constituting the inhibiting portion $15b$ and the first side wall portion $15x$ are simply sewn together. Further, when sewing the fabric housing 15, the triangular corner portion $211b$ may be exposed to the outside, and in this case, the first sewn portion $15x1$ is also a sewn portion in which the common base fabrics constituting the inhibiting portion $15b$ and the first side wall portion $15x$ are simply sewn together. Here, in order to expose the triangular corner portion $211b$ to the outside, in the sewing step (5), the first flat portion 210 and the second flat portion 220 may be overlapped with each other and sewn by valley-folding both end portions of the second flat portion 220 in the vehicle width direction along the axis of symmetry 201 such that the both end portions of the second flat portion 220 in the vehicle width direction match both end portions of the first flat portion 210 in the vehicle width direction, respectively.

Further, in the first embodiment, when the fabric housing 15 is sewn, since the base fabric 200 is sewn and then inverted, the second sewn portion $15y1$ provided at the boundary between the inhibiting portion $15b$ and the second side wall portion $15y$ is a sewn portion in which the common base fabrics constituting the inhibiting portion $15b$ and the second side wall portion $15y$ are sewn together while being valley-folded toward the inside of the fabric housing 15, but similar to the first sewn portion $15x1$, the aspect of the second sewn portion $15y1$ is not limited thereto. When sewing the fabric housing 15, it is not necessary to invert the base fabric 200 after sewing the base fabric 200, and in this case, the second sewn portion $15y1$ is a sewn portion in which the common base fabrics constituting the inhibiting portion $15b$ and the second side wall portion $15y$ are simply sewn together. Further, when sewing the fabric housing 15, the triangular corner portion 212b may be exposed to the outside, and in this case, the second sewn portion 15y1 is also a sewn portion in which the common base fabrics constituting the inhibiting portion 15b and the second side wall portion 15y are simply sewn together.

Although the embodiment of the present disclosure has been described above, the present disclosure is not limited to the contents described in the above embodiment. The configuration described in the embodiments may be appropriately deleted, added, changed, or combined without departing from the scope of the present disclosure.

What is claimed is:

1. An airbag device configured to be disposed in front of an occupant in a vehicle, the airbag device comprising:
an inflator configured to generate gas;
an airbag that is folded and housed, the airbag being configured to be inflated and deployed by the gas generated by the inflator; and
a holding member including an attachment portion to which the inflator is attached, and holding the folded airbag capable of being inflated and deployed from an occupant side opposite the attachment portion, the holding member including an inhibiting portion and a non-inhibiting portion, the inhibiting portion covers a part of the folded airbag from the occupant side, the inhibiting portion being configured to partially inhibit initial inflation and deployment of the airbag,
wherein the folded airbag includes a first folded portion disposed on a vehicle front side, and a second folded portion adjacent to the first folded portion and disposed on a vehicle rear side, the first folded portion is covered by the non-inhibiting portion,
the inhibiting portion covers only the second folded portion and does not cover the first folded portion,
the inhibiting portion has a first region and a second region where inhibiting forces that inhibit the initial inflation and deployment are different from each other,
the first region is located on one side in a vehicle width direction, and
the second region is located on the other side in the vehicle width direction.

2. The airbag device according to claim 1,
wherein the airbag is bellows-folded or tuck-folded in the first folded portion, and is folded in a roll shape in the second folded portion.

3. The airbag device according to claim 1, wherein
the airbag includes a first inflation portion configured to be inflated and deployed on one side with respect to the inflator in a vehicle width direction, and a second inflation portion configured to be inflated and deployed on the other side with respect to the inflator in the vehicle width direction,
the first inflation portion is configured to be inflated and deployed larger than the second inflation portion,
the first inflation portion is covered with the first region,
the second inflation portion is covered with the second region, and
the inhibiting force in the first region is smaller than the inhibiting force in the second region.

4. The airbag device according to claim 1, wherein
the airbag includes two protruding portions that protrude toward a vehicle rear side when the airbag is inflated and deployed,
one of the protruding portions is inflated larger than the other of the protruding portions,
the one of the protruding portions is covered with the first region,
the other of the protruding portions is covered with the second region, and
the inhibiting force in the first region is smaller than the inhibiting force in the second region.

5. An airbag device configured to be disposed in front of an occupant in a vehicle, the airbag device comprising:
an inflator configured to generate gas;
an airbag that is folded and housed, the airbag being configured to be inflated and deployed by the gas generated by the inflator; and
a fabric housing including an attachment portion to which the inflator is attached, and housing the folded airbag capable of being inflated and deployed from an occupant side opposite the attachment portion, the fabric housing including:
an inhibiting portion that covers a part of the folded airbag from the occupant side and that is configured to partially inhibit initial inflation and deployment of the airbag;
a first side wall portion adjacent to one end portion of the inhibiting portion in a vehicle width direction; and
a second side wall portion adjacent to the other end portion of the inhibiting portion in the vehicle width direction, wherein
a first sewn portion, in which a common base fabric constituting the inhibiting portion and the first side wall portion is sewn, is provided at a boundary between the inhibiting portion and the first side wall portion,
a second sewn portion, in which a common base fabric constituting the inhibiting portion and the second side wall portion is sewn, is provided at a boundary between the inhibiting portion and the second side wall portion, and
a length of the first sewn portion is different from a length of the second sewn portion.

* * * * *